US009864970B2

(12) United States Patent
Rinzler et al.

(10) Patent No.: US 9,864,970 B2
(45) Date of Patent: Jan. 9, 2018

(54) SHIELDED USER-PORTABLE CONTAINER CONFIGURED TO INVENTORY ITEMS

(71) Applicant: Twyst LLC, Greenwood Village, CO (US)

(72) Inventors: Charles Cooper Rinzler, Cambridge, MA (US); Kevin Eugene Schaff, Greenwood Village, CO (US); Ryan Patrick McKay, Littleton, CO (US); Hayden Elizabeth Collins, Cherry Hills, CO (US)

(73) Assignee: Twyst LLC, Greenwood Village, CO (US)

( * ) Notice: Subject to any disclaimer, the term of this patent is extended or adjusted under 35 U.S.C. 154(b) by 0 days.

(21) Appl. No.: 15/076,155

(22) Filed: Mar. 21, 2016

(65) Prior Publication Data

US 2017/0140332 A1    May 18, 2017

Related U.S. Application Data

(60) Provisional application No. 62/254,488, filed on Nov. 12, 2015.

(51) Int. Cl.
*G06K 5/00* (2006.01)
*G06Q 10/08* (2012.01)
(Continued)

(52) U.S. Cl.
CPC ....... *G06Q 10/087* (2013.01); *G06K 7/10009* (2013.01); *G06K 7/10356* (2013.01);
(Continued)

(58) Field of Classification Search
CPC .... G07F 7/1008; G06Q 20/341; G06Q 30/06; G06Q 20/20; G06Q 10/087; G06Q 10/08; G07B 15/02; G07B 15/00
(Continued)

(56) References Cited

U.S. PATENT DOCUMENTS 5,418,354 A    5/1995  Halling et al.
5,729,697 A    3/1998  Schkolnick et al.
(Continued)

FOREIGN PATENT DOCUMENTS

WO    WO-2012/152293 A1    11/2012

OTHER PUBLICATIONS

International Search Report and Written Opinion dated Mar. 27, 2017, in the International Application No. PCT/US16/61622, filed Nov. 11, 2016, 21 pages.

*Primary Examiner* — Karl D Frech
(74) *Attorney, Agent, or Firm* — Wilmer Cutler Pickering Hale and Dorr LLP

(57) ABSTRACT

The present disclosure is directed at systems, methods, and apparatus for precisely inventorying items placed within a user-portable container. The system may comprise one or more interrogators configured to repeatedly send interrogation signals to detect tagged items placed within the portable container by a user. The system may also comprise one or more readers configured to detect response signals produced by the tagged items in response to the repeated interrogation signals. The system may also comprise a communication interface configured to provide information regarding the detected response signals to an adjunct processor configured to analyze the signals and determine whether they originate from items within the user-portable container, as well as to maintain an inventory of items within the portable container.

27 Claims, 13 Drawing Sheets

(51) Int. Cl.
  *H04M 1/725* (2006.01)
  *G06K 7/10* (2006.01)
  *H02J 7/00* (2006.01)
  *H02J 7/02* (2016.01)
  *G06K 19/07* (2006.01)

(52) U.S. Cl.
  CPC ..... *G06K 7/10386* (2013.01); *G06K 7/10415* (2013.01); *G06K 19/0723* (2013.01); *H02J 7/0042* (2013.01); *H02J 7/0052* (2013.01); *H02J 7/025* (2013.01); *H04M 1/72527* (2013.01); *H02J 2007/0062* (2013.01)

(58) Field of Classification Search
  USPC ................................ 235/382, 383, 384, 385
  See application file for complete search history.

(56) References Cited

U.S. PATENT DOCUMENTS

| | | | |
|---|---|---|---|
| 7,828,211 B2 | 11/2010 | Landers, Jr. et al. | |
| 8,044,804 B1 | 10/2011 | McReynolds | |
| 8,448,857 B2 * | 5/2013 | Davis | G06Q 30/0603 235/383 |
| 2002/0170961 A1 * | 11/2002 | Dickson | G06K 7/0008 235/383 |
| 2004/0226995 A1 | 11/2004 | Smith | |
| 2005/0218217 A1 | 10/2005 | Hasegawa et al. | |
| 2007/0032224 A1 | 2/2007 | Boyer et al. | |
| 2007/0040682 A1 | 2/2007 | Zhu et al. | |
| 2007/0164863 A1 | 7/2007 | Himberger et al. | |
| 2008/0001748 A1 | 1/2008 | Childress et al. | |
| 2008/0042838 A1 | 2/2008 | Levin et al. | |
| 2008/0210756 A1 * | 9/2008 | Minerley | G06Q 10/087 235/385 |
| 2008/0308630 A1 * | 12/2008 | Bhogal | G06Q 30/02 235/383 |
| 2009/0033493 A1 | 2/2009 | Lin et al. | |
| 2009/0256680 A1 | 10/2009 | Kilian | |
| 2010/0045436 A1 | 2/2010 | Rinkes | |
| 2010/0252626 A1 | 10/2010 | Elizondo et al. | |
| 2010/0253519 A1 | 10/2010 | Brackmann et al. | |
| 2012/0211397 A1 * | 8/2012 | Kilian | G06K 7/10178 206/719 |
| 2012/0280040 A1 | 11/2012 | Carney et al. | |
| 2012/0284132 A1 | 11/2012 | Kim et al. | |
| 2013/0126611 A1 * | 5/2013 | Kangas | G06K 7/10178 235/385 |
| 2014/0001258 A1 | 1/2014 | Chan et al. | |
| 2014/0058891 A1 | 2/2014 | Ko et al. | |
| 2015/0021356 A1 | 1/2015 | Witchell et al. | |
| 2015/0060543 A1 | 3/2015 | Bellows | |
| 2016/0098676 A1 | 4/2016 | Kusens et al. | |
| 2016/0217388 A1 | 7/2016 | Okanohara et al. | |

* cited by examiner

SHIELDED USER-PORTABLE CONTAINER CONFIGURED TO INVENTORY ITEMS

CROSS-REFERENCE TO RELATED APPLICATIONS

This application claims the benefit under 35 U.S.C. §119 (e) of Provisional Application No. 62/254,488, filed Nov. 12, 2015, entitled "SYSTEMS AND METHODS OF MOBILE ELECTRONIC OBJECTS WITH DEFINED ZONES OF OPERATION", the entire contents of which are incorporated by reference herein in their entirety.

TECHNICAL FIELD

The present disclosure is directed at a portable user container for precisely inventorying contents placed therein by a user.

BACKGROUND

Inventory management, point-of-sale, and sale conversion are key challenges for individuals and retailers. Of particular interest are eliminating lines for payment and checkout processes and increasing the resolution of data associated with an individual consumer's shopping experience. Solving these problems will improve sales and consumer shopping experiences and create a novel means to control the flow of information in a retail environment.

SUMMARY

According to one aspect, the present disclosure is directed at a shielded user-portable container configured to inventory items.

In one set of embodiments, the present disclosure is directed at a user-portable container that precisely inventories items within it, the container comprising: a housing comprising electromagnetic shielding material that defines at least part of a three-dimensional interior volume for holding items placed into the container by a user; an interrogator positioned in the interior volume and configured to repeatedly send interrogation signals to detect identifying tags attached to one or more items within the interior volume, wherein the shielding material is configured to at least partially inhibit the interrogation signals from propagating outside the interior volume and thereby inhibit the detection of tags outside of the container; a reader positioned in the interior volume and configured to detect identifying response signals produced by one or more identifying tags; and a communication interface configured to send information regarding the detected response signals so that the response signals may be analyzed to determine whether the one or more identifying tags are within the interior volume or outside the interior volume.

In some embodiments, wherein the interrogator and the reader are part of a single device.

In some embodiments, the communication interface is configured to provide the information regarding the response signals to an adjunct processor configured to maintain an inventory of items disposed within the interior volume based on the response signals.

In some embodiments, the processor is configured to add an item to the inventory of items only when an identifying response signal associated with the added item is received at least a plurality of times in response to a pre-determined number of interrogation signals.

In some embodiments, the processor is configured to remove an item from the inventory of items when the reader does not detect a response signal from a tag associated with the removed item for a pre-determined number of consecutive interrogation signals.

In some embodiments, the processor is located outside of the user-portable container.

In some embodiments, the processor is part of the user-portable container.

In some embodiments, a signal strength of the interrogation signals is selected so as to be sufficient to reach substantially all of the interior volume, but not substantially stronger.

In some embodiments, the communication interface comprises a wireless communication interface.

In some embodiments, the user-portable container is configured to be associated with a user for a temporary period of time.

In some embodiments, the electromagnetic shielding material is configured to at least partially inhibit the response signals produced by tags from propagating outside the interior volume.

In some embodiments, the interrogator is configured to send the interrogation signals at a rate of at least five times per second.

In some embodiments, the user-portable container comprises a liner bag disposed within the interior volume, the liner bag comprising a liner tag that produces liner tag response signals; the reader is configured to detect the liner tag response signals; and the adjunct processor is configured to: determine, via the reader, a presence or absence of the liner tag response signals, and based on the presence or absence of the liner tag response signals, initiate an automatic checkout event.

In another set of embodiments, the present disclosure is directed at a system that precisely inventories items within a user-portable container, the system comprising: an interrogator positioned outside the user-portable container and configured to repeatedly send interrogation signals to detect identifying tags attached to one or more items; and the user-portable container comprising: a housing comprising electromagnetic shielding material that defines at least part of a three-dimensional interior volume for holding items placed into the container by a user, a reader positioned in the interior volume and configured to detect identifying response signals produced by one or more identifying tags in response to the repeated interrogation signals, wherein the electromagnetic shielding material is configured to at least partially inhibit the response signals from propagating outside the interior volume, and a communication interface configured to send information regarding the detected response signals so that the response signals may be analyzed to determine whether the one or more identifying tags are within the interior volume or outside the interior volume.

In some embodiments, the communication interface is configured to provide the information regarding the response signals to an adjunct processor configured to maintain an inventory of items disposed within the interior volume based on the response signals.

In some embodiments, the processor is configured to add an item to the inventory of items only when an identifying response signal associated with the item is received at least a plurality times in response to a pre-determined number of interrogation signals.

In some embodiments, the processor is configured to remove an item from the inventory of items when the reader does not detect a response signal from a tag associated with the removed item for a pre-determined number of consecutive interrogation signals.

In some embodiments, the processor is located outside of the user-portable container.

In some embodiments, the processor is part of the user-portable container.

In some embodiments, the interrogator is part of a portal device installed at a fixed location.

In some embodiments, the interrogator is part of a mobile device.

In some embodiments, the user-portable container is configured to be associated with a user for a temporary period of time.

In some embodiments, the interrogation signals are within a first wavelength range; the response signals are within a second wavelength range; and the electromagnetic shielding material is configured to absorb or reflect electromagnetic signals within the second wavelength range more effectively than electromagnetic signals within the first wavelength range.

In some embodiments, the shielding material of the user-portable container defines an opening into the interior volume, and wherein the interrogator is configured to send the repeated interrogation signals through the opening.

In yet another set of embodiments, the present disclosure is directed at a system that precisely inventories items within a user-portable container, the system comprising: the user-portable container comprising: a housing comprising electromagnetic shielding material that defines at least part of a three-dimensional interior volume for holding items placed into the container by a user, and an interrogator positioned in the interior volume and configured to repeatedly send interrogation signals to detect identifying tags attached to one or more items, wherein the shielding material is configured to at least partially inhibit the interrogation signals from propagating outside the interior volume and thereby inhibit the detection of tags outside of the container; a reader positioned outside the interior volume and configured to detect identifying response signals produced by one or more identifying tags in response to the repeated interrogation signals; and a communication interface configured to send information regarding the detected response signals so that the response signals may be analyzed to determine whether the one or more identifying tags are within the interior volume or outside the interior volume.

In some embodiments, the communication interface is configured to send the information regarding the detected response signals to an adjunct processor configured to maintain an inventory of items disposed within the interior volume based on the response signals.

In some embodiments, the processor is configured to add an item to the inventory of items only when an identifying response signal associated with the item is received at least a plurality of times in response to a pre-determined number of interrogation signals.

In some embodiments, the processor is configured to remove an item from the inventory of items when the reader does not detect a response signal from a tag associated with the removed item for a pre-determined number of consecutive interrogation signals.

In some embodiments, the user-portable container is configured to be associated with a user for a temporary period of time.

In some embodiments, the interrogation signals are within a first wavelength range; the response signals are within a second wavelength range; and the electromagnetic shielding material is configured to absorb or reflect electromagnetic signals within the first wavelength range more effectively than electromagnetic signals within the second wavelength range.

In some embodiments, the shielding material of the user-portable container defines an opening into the interior volume, and wherein the reader is configured to detect response signals that exit the interior volume through the opening.

According to a second aspect, the present disclosure is directed at a user-portable container configured to inventory items using multiple readers.

In a first set of embodiments, the present disclosure is directed at a user-portable container that precisely inventories items within it, the container comprising: a housing that defines at least part of a three-dimensional interior volume for holding items placed into the container by a user; an interrogator positioned in the interior volume and configured to repeatedly send interrogation signals to detect identifying tags attached to one or more items within the interior volume; a plurality of readers disposed at multiple positions within the three-dimensional volume, the readers configured to detect identifying response signals produced by one or more identifying tags in response to the repeated interrogation signals; and a communication interface configured to send information regarding the detected response signals so that the response signals may be analyzed to determine whether the one or more identifying tags are within the interior volume or outside the interior volume.

In some embodiments, the communication interface is configured to provide the information regarding the response signals to an adjunct processor configured to, for a particular tag of the one or more tags: determine how many readers detect a response signal associated with the particular tag; if the number of readers is less than a minimum number of readers, determine that the particular tag is likely not within the interior volume; if the number of readers is greater than or equal to the minimum number of readers, determine that the particular tag is likely within the interior volume; maintain an inventory of items disposed within the interior volume; and add an item associated with the particular tag to the inventory of items only when the processor determines that the particular tag is likely within the interior volume at least a plurality of times in response to a pre-determined number of interrogation signals.

In some embodiments, the processor is configured to remove an item from the inventory of items when the processor determines that a tag associated with the removed item is likely not within the interior volume for a pre-determined number of consecutive interrogation signals.

In some embodiments, the processor is located outside of the user-portable container.

In some embodiments, the processor is located at the user-portable container.

In some embodiments, the plurality of readers each comprise at least one directional antenna that is configured to be more sensitive to electromagnetic signals originating from within the interior volume than to electromagnetic signals originating from outside the interior volume.

In some embodiments, the plurality of readers are configured to detect identifying response signals when the response signals have a signal strength above a minimum signal strength threshold.

In some embodiments, the interior volume is divided into a plurality of spatial sub-zones; and the processor is configured to, for the particular tag: determine a subset of readers that detect the response signal associated with the particular tag, and assign the particular tag to a sub-zone of the plurality of sub-zones based on the subset of readers.

In some embodiments, the interior volume is divided into a plurality of spatial sub-zones; and the processor is configured to, for the particular tag: assign the particular tag to a sub-zone of the plurality of sub-zones based on received signal strength indices for each reader that detects the response signal associated with the particular tag.

In a second set of embodiments, the present disclosure is directed at a system that precisely inventories items within a user-portable container, the system comprising: an interrogator positioned outside the user-portable container and configured to repeatedly send interrogation signals to detect identifying tags attached to one or more items; the user-portable container comprising: a housing that defines at least part of a user-portable three-dimensional interior volume for holding items placed into the container by a user, and a plurality of readers disposed at multiple positions within the three-dimensional volume, the readers configured to detect identifying response signals produced by one or more identifying tags in response to the repeated interrogation signals; and a communication interface configured to send information regarding the detected response signals so that the response signals may be analyzed to determine whether the one or more identifying tags are within the interior volume or outside the interior volume.

In some embodiments, the communication interface is configured to provide the information regarding the response signals to an adjunct processor configured to, for a particular tag of the one or more tags: determine how many readers detect a response signal associated with the particular tag; if the number of readers is less than a minimum number of readers, determine that the particular tag is likely not within the interior volume; if the number of readers is greater than or equal to the minimum number of readers, determine that the particular tag is likely within the interior volume; maintain an inventory of items disposed within the interior volume; and add an item associated with the particular tag to the inventory of items when the processor determines that the particular tag is within the interior volume at least a plurality of times in response to a pre-determined number of interrogation signals.

In some embodiments, the processor is configured to remove an item from the inventory of items when the processor determines that a tag associated with the removed item is likely not within the interior volume for a pre-determined number of consecutive interrogation signals.

In some embodiments, the processor is located at the user-portable container.

In some embodiments, the processor is located outside of the user-portable container.

In some embodiments, the plurality of readers each comprise at least one directional antenna that is configured to be more sensitive to electromagnetic signals originating from within the interior volume than to electromagnetic signals originating from outside the interior volume.

In some embodiments, the plurality of readers are configured to detect identifying response signals when the response signals have a signal strength above a minimum signal strength threshold.

In some embodiments, the interior volume is divided into a plurality of spatial sub-zones; and the processor is configured to, for the particular tag: determine a subset of readers that detect the response signal associated with the particular tag, assign the particular tag to a sub-zone of the plurality of sub-zones based on the subset of readers.

In some embodiments, the interior volume is divided into a plurality of spatial sub-zones; and the processor is configured to, for the particular tag: assign the particular tag to a sub-zone of the plurality of sub-zones based on received signal strength indices for each reader that detects the response signal associated with the particular tag.

In a third aspect, the present disclosure is directed at a user-portable container configured to inventory items using a reader.

In one set of embodiments, the present disclosure is directed at a user-portable container that precisely inventories items within it, the container comprising: a housing that defines at least part of a three-dimensional interior volume for holding items placed into the container by a user; an interrogator disposed within the interior volume and configured to repeatedly send interrogation signals to detect identifying tags attached to one or more items within the interior volume; a reader disposed within the interior volume, the reader configured to detect identifying response signals produced by one or more identifying tags in response to the repeated interrogation signals; and an adjunct processor configured to confirm whether the one or more tags are within the interior volume or outside the interior volume, the processor configured to: maintain an inventory of items disposed within the interior volume, and add an item to the inventory of items only when an identifying response signal associated with the item is received at least a plurality of times in response to a pre-determined number of interrogation signals.

In some embodiments, the processor is located outside the user-portable container.

In some embodiments, at least two of the interrogator, the reader, and the processor are part of a single device.

In some embodiments, the processor is configured to remove an item from the inventory of items when the reader does not detect a response signal from a tag associated with the removed item for a pre-determined number of consecutive interrogation signals.

In some embodiments, at least one of the reader and the interrogator are coupled to at least one antenna attached to the housing.

In some embodiments, the at least one antenna covers at least 25% of the housing.

In some embodiments, the at least one antenna covers at least 50% of the housing.

In some embodiments, the at least one antenna covers at least 75% of the housing.

In some embodiments, the reader is coupled to at least one antenna configured to be more sensitive to response signals originating from within the interior volume than to response signals originating from outside the interior volume.

In some embodiments, the interrogator is coupled to at least one antenna configured to direct the interrogation signals towards the interior of the interior volume.

In some embodiments, the reader is configured to detect identifying response signals when the response signals have a signal strength above a minimum signal strength threshold.

In another set of embodiments, the present disclosure is directed at a system that precisely inventories items within a user-portable container, the system comprising: an interrogator located outside the user-portable container configured to repeatedly send interrogation signals to detect identifying tags attached to one or more items; the user-portable container comprising: a housing that defines at least part of a three-dimensional interior volume for holding items placed into the container by a user, and a reader disposed within the interior volume, the reader configured to detect identifying response signals produced by one or more identifying tags in response to the repeated interrogation signals; and an adjunct processor configured to confirm whether the one or more tags are within the interior volume or outside the interior volume, the processor configured to: maintain an inventory of items disposed within the interior volume, and add an item to the inventory of items only when an identifying response signal associated with the item is received at least a plurality of times in response to a pre-determined number of interrogation signals.

In some embodiments, the interrogator is part of a portal device having a fixed location.

In some embodiments, the interrogator is part of a mobile device.

In some embodiments, the processor is located outside the user-portable container.

In some embodiments, the processor is located at the user-portable container.

In some embodiments, the processor is configured to be in communication with the reader via a wireless connection.

In some embodiments, the reader is coupled to at least one antenna attached to the housing.

In some embodiments, the at least one antenna covers at least 25% of the housing.

In some embodiments, the at least one antenna covers at least 50% of the housing.

In some embodiments, the at least one antenna covers at least 75% of the housing.

In some embodiments, the reader is coupled to at least one antenna configured to be more sensitive to response signals originating from within the interior volume than to response signals originating from outside the interior volume.

In yet another set of embodiments, the present disclosure is directed at a method for precisely inventorying items placed within a user-portable three-dimensional interior volume defined by a user-portable container, the method comprising: repeatedly sending, from an interrogator, interrogation signals for detecting identifying tags attached to one or more items within the interior volume; detecting, at a reader, response signals produced by one or more identifying tags in response to the repeated interrogation signals; and confirming whether the one or more identifying tags are within the interior volume or outside the interior volume by: maintaining an inventory of items disposed within the interior volume; and adding an item to the inventory of items only when an identifying response signal associated with the item is received at least a plurality of times in response to a pre-determined number of interrogation signals.

In some embodiments, the method further comprises removing an item from the inventory of items when the reader does not detect a response signal from a tag associated with the removed item for a pre-determined number of consecutive interrogation signals.

In some embodiments, the item is added to the inventory of items only when the identifying response signal associated with the item is received at least five times in response to at least ten interrogation signals.

According to a fourth aspect, the present disclosure is directed at methods and systems for generating a history of the changing contents of a user-portable container over space and time.

In one set of embodiments, the present disclosure is directed at a method for generating a history of the changing contents of a user-portable container over space and time, the user-portable container defining a user-portable three-dimensional interior volume, the method comprising: using an indoor positioning system to monitor over time a position of the user-portable container within an indoor space; monitoring contents of the user-portable container over time by: repeatedly sending interrogation signals from at least one interrogator to interrogate the contents of the user-portable container, and using a reader disposed within the user-portable container to detect response signals produced by one or more tags attached to one or more items placed within the interior volume in response to the repeated interrogation signals; and generating the history of the changing contents of the user-portable container over space and time based on the monitored position and the monitored contents.

In some embodiments, the method further comprises associating the user-portable container with a user identity; and associating the history with the user identity.

In some embodiments, the positioning system comprises a location tag affixed to the user-portable container and a plurality of transponders located at different positions within the indoor space; and monitoring the position of the user-portable container comprises: receiving, at one or more of the transponders, a location signal produced by the location tag.

In some embodiments, monitoring the position of the user-portable container further comprises repeatedly transmitting, from the one or more transponders, location polling signals; and the location tag is a passive tag configured to produce the location signal by modulating at least one of the location polling signals.

In some embodiments, the at least one interrogator is located at the user-portable container.

In some embodiments, the at least one interrogator is located outside the user-portable container.

In some embodiments, the user-portable container comprises electromagnetic shielding material configured to at least partially inhibit the interrogation signals from propagating outside the interior volume.

In some embodiments, the user-portable container comprises electromagnetic shielding material configured to at least partially inhibit the response signals from propagating outside the interior volume.

In some embodiments, the history of the changing contents is generated by at least one of a processor within the user-portable container, a processor of a mobile device, and a remote server.

In some embodiments, associating the user-portable container with the user comprises establishing a wireless communication session with a mobile device associated with the user.

In some embodiments, associating the user-portable container with the user comprises reading, by the user-portable container, media associated with the user.

In some embodiments, associating the user-portable container with the user comprises receiving, via a user interface, login information from the user.

In another set of embodiments, the present disclosure is directed at a system for generating a history of the changing contents of a user-portable container over space and time, the system comprising: an interrogator configured to repeatedly send interrogation signals; the user-portable container, the container defining a user-portable three-dimensional interior volume, the container comprising: a reader configured to detect response signals produced by one or more tags attached to one or more items placed within the interior volume in response to the repeated interrogation signals, and a transponder configured to wirelessly transmit information regarding the detected response signals; an indoor positioning system configured to monitor over time a position of the user-portable container within an indoor space; and at least one processing station configured to: receive the information regarding the detected response signals transmitted by the transponder, monitor contents of the user-portable container over time based on the received information, and generate the history of the changing contents of the user-portable container over space and time based on the monitored position and the monitored contents.

In some embodiments, the positioning system comprises: a location tag affixed to the user-portable container; and a plurality of transponders located at different positions within the indoor space configured to receive a location signal produced by the location tag.

In some embodiments, the plurality of transponders are further configured to repeatedly transmit location polling signals; and the location tag is a passive tag configured to produce the location signal by modulating at least one of the location polling signals.

In some embodiments, the at least one interrogator is located at the user-portable container.

In some embodiments, the at least one interrogator is located outside the user-portable container.

In some embodiments, the user-portable container comprises shielding material configured to at least partially inhibit the interrogation signals from propagating outside the interior volume.

In some embodiments, the user-portable container comprises shielding material configured to at least partially inhibit the response signals from propagating outside the interior volume.

In some embodiments, the server is configured to associate the user-portable container with a user identity, and to associate the generated history with the user identity.

According to a fifth aspect, the present disclosure is directed at portals configured to inventory items within a user-portable container associated with a user.

In one set of embodiments, the present disclosure is directed at a system configured to inventory items within a user-portable container uniquely associated with a specific user, the system comprising: the user-portable container, the container defining a portable three-dimensional interior volume, the container comprising a programmable circuit configured to store a user identity uniquely associated with the specific user; an interrogator configured to repeatedly send interrogation signals; a reader configured to detect identifying response signals produced by tags attached to items within the interior volume in response to the repeated interrogation signals; and at least one processor configured to: inventory items disposed within the interior volume based on the response signals, query the programmable circuit to determine the stored user identity, and associate the inventory with the user identity.

In some embodiments, the user identity is an anonymous user identity that uniquely identifies the user but does not provide information regarding a personal name of the user.

In some embodiments, at least one of the interrogator, the reader, and the at least one processor are located outside the user-portable container.

In some embodiments, the interrogator, the reader, and the at least one processor are part of a portal device located outside the user-portable container.

In some embodiments, the portal device defines a three dimensional volume configured to receive the user-portable container.

In some embodiments, the portal device defines a two dimensional surface configured to receive the user-portable container.

In some embodiments, the portal device is located at an exit of a store.

In some embodiments, the user-portable container comprises electromagnetic shielding material configured to at least partially inhibit the interrogation signals from propagating to tags attached to items outside the interior volume.

In some embodiments, the user-portable container comprises electromagnetic shielding material configured to at least partially inhibit the reader from detecting response signals produced by tags located outside the interior volume.

In some embodiments, the at least one processor is configured to update a user profile associated with the user identity based on the inventory.

In some embodiments, the at least one processor is configured to perform an automatic checkout operation by calculating a total payment based on the inventory, and by charging a payment account associated with the user identity.

In some embodiments, the system further comprises a display, wherein the at least one processor is configured to display the inventory associated with the user identity on the display.

In some embodiments, the programmable circuit is reprogrammable to store a second user identity.

In another set of embodiments, the present disclosure is directed at a method for inventorying items within a user-portable container uniquely associated with a specific user, the method comprising: repeatedly sending, from an interrogator, interrogation signals; detecting, at a reader, identifying response signals produced by tags attached to items within the user-portable container; generating, at at least one processor communicably coupled to the reader, an inventory of items disposed within the user-portable container based on the response signals; receiving, at a transponder communicably coupled to the at least one processor, a user identity stored at a programmable circuit at the user-portable container, wherein the user identity is uniquely associated with the specific user; and associating the generated inventory with the user identity.

In some embodiments, the user identity is an anonymous user identity that uniquely identifies the user but does not provide information regarding a personal name of the user.

In some embodiments, at least one of the interrogator, the reader, the at least one processor, and the transponder are located outside the user-portable container.

In some embodiments, the interrogator, the reader, the at least one processor, and the transponder are part of a portal device located outside the user-portable container.

In some embodiments, the portal device defines a three dimensional volume configured to receive the user-portable container.

In some embodiments, the portal device defines a two dimensional surface configured to receive the user-portable container.

In some embodiments, the portal device is located at an exit of a store.

In some embodiments, the user-portable container comprises electromagnetic shielding material configured to at least partially inhibit the interrogation signals from propagating to tags attached to items outside the interior volume.

In some embodiments, the user-portable container comprises electromagnetic shielding material configured to at least partially inhibit the reader from detecting response signals produced by tags located outside the interior volume.

In some embodiments, the method further comprises updating, at the at least one processor, a user profile associated with the user identity based on the inventory.

In some embodiments, the method further comprises performing, at the at least one processor, an automatic checkout operation by calculating a total payment based on the inventory, and by charging a payment account associated with the user identity.

In some embodiments, the method further comprises displaying, at a display communicably coupled to the at least one processor, the inventory associated with the user identity.

In some embodiments, the programmable circuit is reprogrammable to store a second user identity.

DETAILED DESCRIPTION OF THE INVENTION

Figure 1:
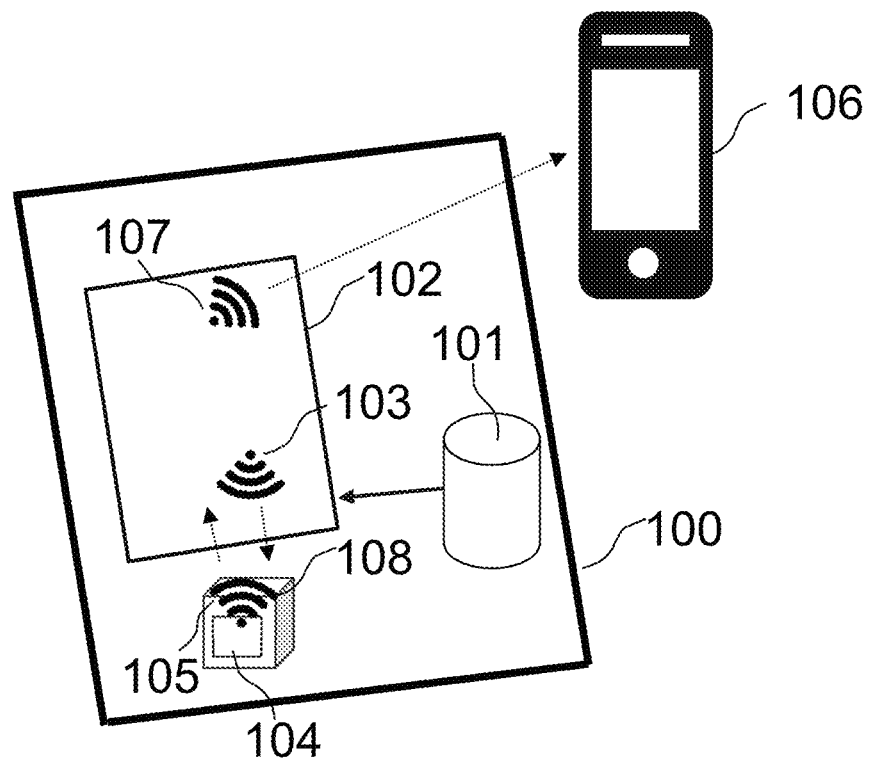
FIG. 1 depicts an exemplary portable container, according to some embodiments.

The present disclosure is directed at solving problems of inventory management, point-of-sale, and data collection for consumers and retailers in a retail environment. The present disclosure further provides inventions that will eliminate lines for payment and checkout.

These problems have been identified by the industry. However, to date no solution has been put forth that can effectively solve the challenges of inventory management and the checkout process. Of particular consideration is the ability to identify: 1) who is the user/customer, 2) what does the customer wish to pay for, and 3) what were the customer's shopping patterns during an in-store shopping experience. Heretofore proposed solutions to automate checkout have failed due to key challenges in inventory management that are herein solved.

Provided herein are novel systems and methods of electronic containers that interrogate, read, and communicate and use information from tags associated with items placed within a predefined volume. Of particular interest is providing a portable container such that the predefined volume, or the predefined set of tags and associated items, are transportable within a store or other environment. The systems and methods taught herein enable the effective inventorying of items within a predefined volume and the use of this information to provide for point-of-sale and collection of shopping experience related data.

Portable containers may include, but are not limited to including, bags, shopping bags, carts, baskets, boxes, pocketed articles of clothing, pocketed materials, trays, suitcases, handbags, tables, and more. A portable container may be associated with a portable electronic device (e.g., interrogator and/or reader) that serves to aid or perform inventorying processes within or external to the portable container. The portable container and portable electronic device may be separate components that are attached together, may be distinct components that are separable from each other, and/or may be integrated into the same component.

Portable electronic devices, and portable containers, may have components that perform a range of functions that include, but are not limited to, transmitting an interrogating signal (the interrogator), receiving a signal via a reader (the reader), transmitting, receiving, or communicating information to or from an external or associated device (the transponder and the external device), energy storage, information processing (the processor), sensing (the sensor), and more. These components may be separate components that are attached together, may be distinct components that are separable from each other, and/or may be integrated into the same component.

A portable electronic device may perform all or a subset of the functionalities of a portable container. Typically, the portable electronic device will be associated with a portable container, and together these objects comprise a complete inventory management, point-of-sale, and data management system.

An interrogator communicates power or information to tags. This information can include a signal to turn on a tag (if the tag is an active tag), a signal to read a tag, a signal to program a tag, a signal to power a tag, and more. The interrogator typically comprises one or a plurality of antennas. These antennas may be located on, in, or near the portable electronic device or the portable container. They may have a predefined orientation with respect to a predefined volume. They may include, but are not limited to including, dipole based antennas such as short dipole, dipole, half-wave, broadband dipoles, monopole, and folded dipole antennas; traveling wave based antennas such as helical, Yagi-Uda, and spiral antennas; reflector based antennas such as corner and parabolic reflector antennas; microstrips such as rectangular microstrips (patch), and planar inverted-F antennas; log-periodic based antennas such as bow tie, log-periodic, and log-periodic dipole antennas; aperture based antennas such as slot, cavity-backed slot, inverted-F, slotted waveguide, horn, Vivaldi, and telescope antennas; and other antenna including near field communication antennas, fractal antennas and more. Exemplary antennas may comprise materials including copper, silver, metal, gold, plastic, polymers, ceramics, glasses, textiles, screen-printed materials, inks, conductive inks, semiconductors, and more for both interrogating and reading the signal. Each antenna may further provide a dual energy range. The energy transmitted by the interrogator may be an electromagnetic signal that is in the RFID, WiFi, RF, UHF, LF, HF, Broadband spectrum, and more.

The antenna may have a profile between 0.001 and 0.01 in^2, 0.01 and 0.1 in^2, 0.1 and 1 in^2, 1 and 10 in^2, and greater than 10 in^2. The antenna may have a volume between 0.000001 and 0.00001 in^3, 0.00001 and 0.001 in^3, 0.01 and 0.1 in^3, 0.1 and 1 in^3, and greater than 1 in^3. The antenna may have a mass between 0.000001 and 0.0001 grams, 0.0001 and 0.01 grams, 0.01 and 0.1 grams, 0.1 and 1 grams, 1 and 10 grams, 10 and 100 grams, and greater than 100 grams. The antenna may comprise materials including, but not limiting to, metals, semiconductors, plastics, composites, ceramics, polymers, textiles, insulators and more. The antenna may be of a predetermined color or combination of colors including, but not limited to, black, metallic, copper, silver, white, red, green, pink, blue, orange, yellow, purple and more. The antenna may be partially or wholly transparent. The antenna may be flexible.

The interrogation signal typically comprises electromagnetic radiation. The wavelength of the electromagnetic radiation can be between 120 and 250 nm, 250 and 500 nm, 500 and 1000 nm, 1 and 10 um, 10 and 1000 um, 1 mm and 10 mm, 10 mm and 100 mm, 100 mm and 1000 mm, 1 m and 10 m, and 10 m and more. Typically the signal will comprise radio-frequency signals. As one preferred embodiment, the interrogation signal may comprise 860-960 MHz radiation, typically referred to as UHF RF radiation. As another preferred embodiment, the interrogation signal may comprise Bluetooth RF radiation. As a still further embodiment, the interrogation signal may comprise WiFi radiation. The interrogation signal may also include a plurality of wavelengths. The interrogation signal may further be provided by one or a plurality of antennas.

The power of the interrogation signal is typically between about 0.01 and 1 uW, 1 and 10 uW, 10 and 1000 uW, 1 and 10 mW, 10 and 100 mW, 100 and 1000 mW, 1 and 5 W, and more than 5 W. The energy of the interrogation signal may be between 1 and 100 nanojoules, 0.1 and 10 microjoules, 10 and 1000 microjoules, 1 and 10 millijoules, 10 and 1000 millijoules, and 1 or more joules.

The interrogation signal may be continuous, or may be intermittent. Typically, the interrogation signal will be on for between 0.1 and 1 ms, 1 and 10 ms, 10 and 100 ms, 100 and 1000 ms, 1 and 10 s, 10 and 100 s, and more than 100 s. The duty cycle of the interrogation signal may be between 0.00001% and 0.0001%, 0.0001% and 0.001%, 0.001% and 0.01%, 0.01% and 0.1%, 0.1% and 1%, 1% and 10%, and 10% or more. The interrogation signal may be turned on or off by a timing algorithm.

A reader receives power or information from tags. This information can include information about a predetermined item, inventory information, payment information, user information, security information, signal information, value information, store information, and more. The reader typically comprises one or a plurality of antennas. These antennas may be located on, in, or near the portable electronic device or the portable container. They may have a predefined orientation with respect to a predefined volume. They may include, but are not limited to including, dipole based antennas such as short dipole, dipole, half-wave, broadband dipoles, monopole, and folded dipole antennas; traveling wave based antennas such as helical, Yagi-Uda, and spiral antennas; reflector based antennas such as corner and parabolic reflector antennas; microstrips such as rectangular microstrips (patch), and planar inverted-F antennas; log-periodic based antennas such as bow tie, log-periodic, and log-periodic dipole antennas; aperture based antennas such as slot, cavity-backed slot, inverted-F, slotted waveguide, horn, Vivaldi, and telescope antennas; and other antenna including near field communication antennas, fractal antennas and more. Exemplary antennas may comprise materials including copper, silver, metal, gold, plastic, polymers, ceramics, glasses, textiles, screen-printed materials, inks, conductive inks, semiconductors, and more for both interrogating and reading the signal. Each antenna may further provide a dual energy range. The energy transmitted by the interrogator may be an electromagnetic signal that is in the RFID, WiFi, RF, UHF, LF, HF, Broadband spectrum, and more.

The antenna may have a profile between 0.001 and 0.01 in^2, 0.01 and 0.1 in^2, 0.1 and 1 in^2, 1 and 10 in^2, and greater that 10 in^2. The antenna may have a volume between 0.000001 and 0.00001 in^3, 0.00001 and 0.001 in^3, 0.01 and 0.1 in^3, 0.1 and 1 in^3, and greater than 1 in^3. The antenna may have a mass between 0.000001 and 0.0001 grams, 0.0001 and 0.01 grams, 0.01 and 0.1 grams, 0.1 and 1 grams, 1 and 10 grams, 10 and 100 grams, and greater than 100 grams. The antenna may comprise materials including, but not limiting to, metals, semiconductors, plastics, composites, ceramics, polymers, textiles, insulators and more. The antenna may be of a predetermined color or combination of colors including, but not limited to, black, metallic, copper, silver, white, red, green, pink, blue, orange, yellow, purple and more. The antenna may be partially or wholly transparent. The antenna may be flexible.

The reader signal typically comprises electromagnetic radiation. The wavelength of the electromagnetic radiation can be between 120 and 250 nm, 250 and 500 nm, 500 and 1000 nm, 1 and 10 um, 10 and 1000 um, 1 mm and 10 mm, 10 mm and 100 mm, 100 mm and 1000 mm, 1 m and 10 m and 10 m and more. Typically the signal will comprise radio-frequency signals. As one preferred embodiment, the reader signal may comprise 860-960 MHz radiation, typically referred to as UHF RF radiation. As another preferred embodiment, the reader signal may comprise Bluetooth RF radiation. As a still further embodiment, the reader signal may comprise WiFi radiation. The reader signal may also include a plurality of wavelengths. The reader signal may further be provided to one or a plurality of antennas.

The power of the reader signal is typically between about 0.01 and 1 uW, 1 and 10 uW, 10 and 1000 uW, 1 and 10 mW, 10 and 100 mW, 100 and 1000 mW, 1 and 5 W, and more than 5 W. The energy of the reader signal may be between 1 and 100 nanojoules, 0.1 and 10 microjoules, 10 and 1000 microjoules, 1 and 10 millijoules, 10 and 1000 millijoules, and 1 or more joules.

The reader signal may be continuous, or may be intermittent. Typically, the interrogation signal will be on for between 0.1 and 1 ms, 1 and 10 ms, 10 and 100 ms, 100 and 1000 ms, 1 and 10 s, 10 and 100 s, and more than 100 s. The duty cycle of the interrogation signal may be between 0.00001% and 0.0001%, 0.0001% and 0.001%, 0.001% and 0.01%, 0.01% and 0.1%, 0.1% and 1%, 1% and 10%, and 10% or more. The reader signal may be turned on or off by a timing algorithm. The reader signal may be encrypted.

A transponder communicates or receives information. A transponder may be attached to or integrated with a portable container or portable electronic device, and used by the portable container and/or portable electronic device to communicate with an external device. In addition or in the alternative, a transponder may be attached to or integrated with an external device, and used by the external device to communicate with the portable container and/or portable electronic device. The information communicated between the portable container/portable electronic device and the external device can include inventory information, user information, payment information, device status information, information about the portable container, information about the portable electronic device, marketing information, images, data, prices, promotional materials, coupons, targeted advertisements, advertisements, and more. The transponder may include WiFi, Bluetooth, Zigbee, ZWave, and more devices. The transponder may be wired or wireless. Typically the communication will be wireless, and may be encrypted.

The external device may include, but is not limited to including, mobile phones, tablets, computers, servers, displays, databases, smart devices, portable electronic devices, portable containers, robots, portals, and more. The external device may be affixed to or associated with the portable container or portable electronic device. The external device may be distinct from the portable container or portable electronic device. The external device may be within a predefined distance of the portable container or portable electronic device. This distance will typically be between 0.5 and 10 inches, 10 and 24 inches, 2 and 5 feet, 5 and 25 feet, 25 and 100 feet, 100 and 500 feet, and more than 500 feet.

The portable electronic device or portable container may also comprise a processor. The processor may perform a number of operations as part of a portable electronic device or portable container or both. The processor may serve to interpret, modify, or generate interrogation, reader, or transponder signals or their derivatives. The processor may generate information for a display. The processor may be programmable. The processor may include, but is not limited to including, microprocessors, semiconductor devices, FPGAs, printed circuits, microcomputers, computers, and more.

The portable electronic device or portable container can comprise an energy storage device. The energy storage device provides energy for components of the portable electronic device or portable container, or both. Energy storage devices may include, but are not limited to including, batteries, fuel cells, capacitors, harvesters, and more. In one embodiment, the energy storage device is one or a plurality of lithium ion batteries. The weight of the energy storage device is important due to the portability requirements of certain embodiments herein. The energy storage device may weigh between 0.01 and 0.1 lbs, 0.1 and 1 lb, 1 and 10 lbs, and more than 10 lbs. The energy storage device may contain between 0.001 and 1 Wh, 1 Wh and 10 Wh, 10 Wh and 100 Wh, 100 Wh and 1 kWh, and more than 1 kWh or stored electrical energy.

The portable electronic device or portable container may be encased in or comprised of materials including plastics, polymers, metals, ceramics, composites, leather, wood, cork, other natural materials, textiles, and more.

The portable container or portable electronic device solves previously unsolved challenges of inventory management. Previous attempts to automate checkout by use of tags associated with items that are wirelessly read by a reader have been unsuccessful. This is primarily due to the inaccuracy of the read that is achievable with typical RFID systems, the preferred tagging paradigm. The read accuracy of a typical tag through a typical gateway, whereby the tag is sufficiently small and inexpensive to merit association with an item in a retail environment, may be less than 95% accurate. Thus, some items may not be read and the automatic checkout process would fail. Additionally, many items interfere with the electromagnetic signals associated with the reading process. As an example, metallic or water-laden objects attenuate, absorb, or reflect the signal and result in poor readability by traditional systems.

In some embodiments, the presently disclosed systems, apparatus and methods overcome these challenges by providing for a portable container. The portable container defines a predetermined 3 dimensional volume. Providing a predetermined 3 dimensional volume that is easily transportable by a human user (e.g., in the form of a shopping cart, handbag, backpack, or other hand-portable container), enables accurate reading of objects with previously unobtainable accuracy.

The portable container may define a predetermined 3 dimensional volume of between 0.1 and 10 in^3, 10 and 100 in^3, 100 and 1000 in^3, 1000 and 10000 in^3, 5 and 10 ft^3, 10 and 1000 ft^3, and more than 1000 ft^3. The predetermined 3 dimensional volume is the volume within which tags of items are to be placed in order to be interrogated, read, or both. Other tags or objects may be included within the predetermined 3 dimensional volume.

The portable container may comprise materials including, but not limited to, plastics, polymers, metals, ceramics, composites, leather, wood, cork, other natural materials, textiles, paper, cardboard, nylon, optical materials, conducting materials, and more.

The portable container may define a predetermined 3 dimensional volume by several methods. For example, in some embodiments, this 3 dimensional volume may be defined using shielding material. This shielding may attenuate, absorb, reflect, amplify, or modify electromagnetic radiation. The shielding may be wavelength-specific, and may shield signals of a predetermined wavelength or range or wavelengths but not a different predetermined wavelength or range of wavelengths. By means of example, the shielding may reflect or absorb UHF RFID signals, but transmit Bluetooth signals. The shielding may be integrated into all or part of the body of the portable container, or may be implemented as a separate member that is attached to the portable container. The shielding may define a shielded volume that includes all or part of the portable container.

The shielding material may include, but is not limited to including, metals, semiconducting materials, ceramics, foils, electronically conducting materials, magnetically susceptible materials, films, foils, fabrics, composites, paper, active or passive materials, antennas, absorbers, paints, adhesives, plates, and more. The shielding may be screen printed, affixed, bolted, stitched, sewn, placed, or adhered to the portable electronic object, or may be associated by other means, or may be integral to the portable container.

The 3 dimensional volume may additionally be determined by means of one or more readers. The one or more readers may be attached to or integrated with the portable electronic device and/or portable container, or may be external to the portable electronic device and/or portable container. The readers may also be oriented according to certain pre-determined directions so as to define the 3 dimensional volume (e.g., oriented towards the interior of the 3 dimensional volume). By way of example, a plurality of readers may be present in the system. If a tag signal is read by a predetermined subset of the readers, then the tag and associated item will be considered to be present in the predetermined 3 dimensional volume. If a tag signal is read by less than a predetermined number, or by a different predetermined subset of the readers, including no readers, then that tag and associated item will not be considered to be present in the predetermined 3 dimensional volume.

The 3 dimensional volume may additionally be defined by means of having one or more interrogators. The one or more interrogators may be attached to or integrated with the portable electronic device and/or portable container, or may be external to the portable electronic device and/or portable container. The interrogators may also be oriented according to certain pre-determined directions so as to define the 3 dimensional volume (e.g., oriented towards the interior of the 3 dimensional volume). By way of example, if an interrogator signal of a certain pre-determined magnitude and/or range is able to interrogate a tag, then the tag is defined to be within the predetermined 3 dimensional volume. As an additional example, if a reader reads a signal from a tag, the tag is defined to be within a predefined 3 dimensional volume associated with the interrogator(s). Thus, the 3 dimensional volume can be defined by the orientation of one or more readers and/or one or more interrogators.

The 3 dimensional volume may additionally be defined by means of the power of the interrogator or reader signal. Tags may only be read if the signal is of a sufficient minimum magnitude, or of a magnitude within a predefined range. The orientation, geometry, power, or design of the interrogator, reader, or both will determine the 3 dimensional volume within which a signal of sufficient power is provided to read or interrogate a tag.

The 3 dimensional volume may additionally be defined by software. As an example, RFID tags may return information to a reader including the power of a signal. Software or an application may use this information to define a range or power of signals, or a predetermined set of locations of reader or interrogators associated with the signal, to define a 3 dimensional volume.

The portable container may contain antennas in a predetermined orientation to define a 3 dimensional volume. By means of example, there may be one or a plurality of antennas associated with the sides of the object, such that the interrogator or reader signal is substantially confined within a predetermined 3 dimensional volume inside, outside, or both of the boundaries of the portable container.

The portable container may have a predetermined geometry. This predetermined geometry may serve a number of purposes. As a first purpose, the geometry can be of aesthetic value. As an additional purpose, the geometry may serve to provide functionality as a portable container. As a further purpose, the geometry may be optimized in conjunction with shielding to define a distribution of electromagnetic energy for the interrogation or reading of tags, or for the transponder signal. By such means an optimization of the readability of tags within a predefined 3 dimensional volume can be achieved. This shaping and tuning of the electromagnetic radiation enables the reading of items, such as metallic objects, electronic objects, and produce, that were previously challenging or impossible to read accurately.

The tags may be associated with and/or affixed to items, and may store information regarding those items. The information contained on the tags may include, but is not limited to including, ID numbers, item information, UPC codes, security information, signal information, date, time, user information, and more. A tag is any object that contains electronic information that is interrogatable, or communicates a signal with electromagnetic energy. The tags may be active or passive. Active tags comprise an energy storage device or energy source, such as a battery, whereas passive tags typically do not include an energy storage device or energy source, and instead derive power from an interrogation signal from an interrogator. Tags may include RFID tags, HF tags, UHF tags, Bluetooth tags, beacons, ZWave devices, Zigbee devices, UPC codes, and more. One or more tags may be present on a single item. Tags may also be associated with the portable electronic device or portable container. Information stored on the tags may be encrypted, permanent, or reprogrammable. The tag may have a profile between 0.001 and 0.01 in$^2$, 0.01 and 0.1 in$^2$, 0.1 and 1 in$^2$, 1 and 10 in$^2$, and greater that 10 in$^2$. The tag may have a volume between 0.000001 and 0.00001 in$^3$, 0.00001 and 0.001 in$^3$, 0.01 and 0.1 in$^3$, 0.1 and 1 in$^3$, and greater than 1 in$^3$. The tag may have a mass between 0.000001 and 0.0001 grams, 0.0001 and 0.01 grams, 0.01 and 0.1 grams, 0.1 and 1 grams, 1 and 10 grams, 10 and 100 grams, and greater than 100 grams. The tag may comprise materials including, but not limiting to, metals, semiconductors, plastics, composites, ceramics, polymers, textiles, insulators and more. The tag may be of a predetermined color or combination of colors including, but not limited to, black, white, red, green, pink, blue, orange, yellow, purple and more. The tag may be partially or wholly transparent. The tag may be flexible.

The item to which a tag is associated and/or affixed may include clothing, textiles, fashion items, jewelry, food, hardware, beverages, electronics, kitchenware, industrial items, parts, fasteners, storage media, home improvement products, tools, athletic wear, digital media, and more. The item may have a profile between 0.01 and 1 in$^2$, 1 and 5 in$^2$, 5 and 10 in$^2$, 10 and 100 in$^2$, 100 and 1000 in$^2$, and greater than 1000 in$^2$. The item may have a volume of between 0.1 and 1 in$^3$, 1 and 5 in$^3$, 5 and 10 in$^3$, 10 and 100 in$^3$, 100 and 1000 in$^3$, 1000 and 10000 in$^3$, and greater than 10000 in$^3$. The item may comprise materials including, but not limited to, plastics, ceramics, metals, semiconductors, textiles, fabrics, organic materials, composites, polymers, insulators, glasses, and more.

The items and their associated and/or affixed tags may be placed inside of the 3 dimensional volume defined by the portable electronic device or portable container. The items and associated tags may additionally be attached or affixed to the portable container by means of a fastener, strap, button, zipper, lining, stitching, or related attachment. Thus, by way of example, an item with an associated tag may be connected to the portable container by means of a fastener, the fastener serving as a means of communicating a reader signal from the tag to the reader.

The portable electronic device or portable container may also be associated with an additional electronic device such as a mobile phone. The portable container or portable electronic device may be configured to use wired or wireless interfaces to convey power and/or information to the additional electronic device. Examples of wired interfaces can include, but are not limited to, USB, micro-USB, iPhone cable, iPad cable, RS232, and more. Examples of wireless communication can include WiFi, Bluetooth, NFC, or inductive coupling. The information conveyed to and/or from the additional electronic device can include user information, inventory information, point-of-sale and payment information, marketing information, advertisements, coupons, and more.

The wireless and/or wired communication may use transmission control protocol (TCP), user datagram protocol (UDP), internet control message protocol (ICMP), hypertext transfer protocol (HTTP), post office protocol (POP), file transfer protocol (FTP), internet message access protocol (IMAP), link magnate protocol (LMP), Secure Shell protocol (SSH), OSI protocols, Secure Socket Layer (SSL), Ethernet globalization protocols (E6), Bitcoin protocol, transport layer security protocol (TLS), server message block (SMB) protocol, short message service, telnet protocol, TCP/IP model and stack, routing protocols, fiber channel network protocol, frequency division multiple access, generic access network, Wimax standards, wideband integrated dispatch enhanced network, wideband code-division multiple access, universal mobile telecommunication service, time division synchronous code Davion or a related method. The signal may use modulation of pulse width, delta-sigma, pulse-amplitude, pulse code, pulse-density, pulse-position, digital baseband, analog, digital, which further may use phase-shift keying, frequency shift keying, amplitude shift keying, on-off keying, quadrature amplitude, continuous phase, orthogonal frequency-division multiplexing, wavelet modulation, trellis coded modulation, spread spectrum techniques, automatic digital modulation recognition (ADMR) pulse amplitude, pulse-width, pulse-position, differential PCM, adaptive DPCM, pulse-density modulation, delta modulation, adaptive modulation, space modulation or a related method.

A critical problem that is solved herein is the challenge of creating a point-of-sale that enables the user to checkout and provide payment for a predetermined set of items. Of interest is the ability of making this payment and checkout process occur without the need to stand in a line, remove items from a shopping bag, or other inconveniences to the consumer that may affect the shopping experience or the probability of a sale.

The portable electronic device and/or portable container can define a 3 dimensional volume as described herein. The portable electronic device and/or portable container can inventory tags present within this volume. Further provided is the ability to associate a user with the inventory of tags within the 3 dimensional volume. Still further provided is the connection to external databases and/or servers that can process payment information. Still further provided is the ability of the user/customer/employee to define a checkout operation. Thus, the portable electronic device and/or portable container can create a point-of-sale opportunity and comprise a portable checkout system.

The portable electronic device and/or portable container can be used in conjunction with a payment system, such as but not limited to, credit cards, online payment, payment with a mobile phone, debit card, bank account, store balance, gift card, and more. Additionally provided is a payment reader that facilitates use of this payment system, such as a credit card, debit card, gift card, or other reader.

Identifying the user of a portable electronic device or portable container may be desirable in certain embodiments of the present invention, including point of sale and retail analytics. Provided herein are methods and systems to identify a user. These include, but are not limited to including, associating the portable electronic device or portable container with an external device associated with the user, such as the user's mobile phone, tablet, or other electronic device. This association can be accomplished by pairing the portable electronic using a wireless communication link (e.g., Bluetooth, NFC). Other ways of identifying the user of a portable electronic device or portable container include scanning or reading media containing user information including, but not limited to, credit cards, debit cards, store loyalty cards, RFID tags, and/or NFC tags. Yet other ways of identifying the user include providing an interface for the user to provide a biometric signature (e.g., a fingerprint scanner), or login information.

Still further provided are sensors associated with or integral to the portable electronic device or portable container. Additional information, or supplemental information, to the information communicated between tags and readers may be desired on items within a portable container. Of particular interest is having a secondary check of the inventory of the 3 dimensional volume. Sensors may provide additional information to aid in determining the presence or absence of items within a predefined 3 dimensional volume. This can solve concerns of security and others. Sensors may include, but are not limited to including, sensors of weight, size, color, sound, texture, transparency, reflectivity, spectral information, and more. By means of example of the functionality of a sensor, a portable container has a predefined 3 dimensional volume. Suppose there are 4 tags associated with 4 items in this volume, and 1 additional item without a tag, disposed within the 3 dimensional volume. The reader reads 4 tags associated with items of predetermined weight. The sensor is a weight sensor. The weight sensor detects weight in addition to the expected weight of the 4 items with associated tags. The weight sensor may then send a signal to a transponder that relays this information to an application on an external device, which indicates the weight detected by the sensor does not correspond to the expected weight of the 4 tagged items.

Information communicated to and from external devices may be used to perform a number of operations. External devices may include software and applications that interact with a portable container or portable electronic device in predetermined ways. The information sent to an external device, including inventory and user information, may be used to establish payments, provide data to a retail store employee, and more. The information sent from an external device, including item information, advertisement, price information, and more may be used by the consumer/user to make decisions regarding their shopping experience. External devices will often have screens, displays, or indicators. Displays may include, but are not limited to including, LCD, LED, OLED, quantum dot display, TFT, CRT, Plasma, E-Paper, E-Ink, Electroluminescent, VF, Nixie Tube, HPA, SED, and others. The display may be associated with or affixed to the mobile object. The display may be powered from a battery associated with or affixed to the mobile object. The display may be turned on or off by a signal from an external electronic device, an internal electronic device, a switch, or a button. The display may display colors, light, information, words, symbols, and more. The display may be a part of or associated with an electronic wireless device.

Information displayed or indicated may include, but is not limited to including, inventory, price, quantity, user information, portable electronic device or portable container information and status, time, date, advertisements, marketing materials, logos, branding materials, coupons, help information, item information, availability, wireless signal connection status, and more.

The information communicated to and from external devices may assign tasks. By means of example, information communicated from an external mobile device may assign the task of performing an inventory management of the portable container. As an additional example, information communicated to an external server may assign the task of performing a payment operation.

A portable container may contain additional container objects, or additional portable containers. These may be attached, placed, affixed, or distinct. By means of example, a portable container may be a shopping bag. There may be a second bag, a liner bag that does not provide the full electronic functionality described by the portable container. This liner bag is placed substantially inside of the portable container and is removable. Additional items with tags may be placed inside of the 3 dimensional volume defined by the liner bag. Thus, at the end of a user session, the liner bag and items associated with the portable container may be removed. As an additional example, multiple containers may be placed within the portable container. These multiple containers may define subzones of the portable container 3 dimensional volume.

Portable electronic devices and/or portable containers may be desired to operate within a predetermined location. By means of example, a portable container may be desired to operate within one or a plurality of stores. Additionally, a predetermined location may have a number of predefined zones. In some embodiments, it may be desirable to determine the location of portable containers and/or electronic devices, the location of users, and/or the location of items or tags at greater resolution than the entire location. Information of these and other kinds may be wished to be acquired for zones or subzones of zones of the predetermined location. By means of example, it may be desirable to know when a portable container is present within a predefined zone defined to be the entrance or exit to a store, the changing room, a display, or more. It may yet further be desirable to know the contents of this portable container, or user information.

To solve these problems a portal is provided. A portal is a predefined 2 dimensional area or 3 dimensional volume. The portal may be stationary, or may be portable. Portals serve to provide a predetermined location (volume) within which to determine the presence or absence of items, portable electronic devices, portable containers, users, employees, and more. By means of example, a portal may be a portable container or portable electronic device. By additional means of example, a portal may be a predefined room of a store, such as a changing room. By additional means of example, a portal may the entrance or exit of a store. Portals are provided by components and devices described herein. These include interrogators, readers, transponders, and more. The presence or absence of a predetermined object within a portal may trigger an event. By means of example, the presence of a portable container with tags and items substantially contained within its 3 dimensional volume in a portal may trigger an inventorying operation, a payment operation, a sound, a displayed signal, or other events. By additional means of example, a portable container may contain a reader and an energy storage device. When the portable container is located within or on a portal, wherein the portal comprises one or more interrogators, the interrogators can send an interrogation signal to tagged items disposed within the portable container, which causes the tags to respond with reader signals that are detected by the reader contained in the portable container. The portable container can then relay tag information to an external device. By additional means of example, the portable container may contain a tagged item. When the portable container is present in the 3 dimensional volume, or on the 2 dimensional area, of a portal, the portal performs a reading operation of the tag associated with the portable container, and this information is used to determine the presence of the portable container within the portal. These and other embodiments are envisioned, and the discussion does not limit the provided embodiments herein.

Security is a critical feature of an automated checkout system. We herein provide for the use of portals and portable containers to ensure minimal item attrition (items leaving the store without being paid for). The exit to the store can define, or be substantially defined by, a portal. The portal may comprise interrogators and/or readers. The portal may read tags present within the portal's substantially predetermined 3 dimensional volume. By means of example, a portable container is present in the portal. The portable container contains items and associated tags that have been inventoried by the portable container, or a portable electronic device. The portable container contains, or is in proximity to, additional items and additional associated tags that have not been inventoried by the portable container or a portable electronic device. The portal reads these additional tags and sends a signal of their presence within the portal. As an additional embodiment, no portable container is present within the portal.

It may be additionally desirable to not allow the removal of portable containers or portable electronic devices from a predetermined location. The exit to the store can define, or be substantially defined by, a portal. The portal may comprise interrogators and/or readers. The portal may read tags present within the portal's substantially predetermined 3 dimensional volume. Portable electronic devices or portable containers may comprise a tag. The presence of a tag associated with a portable electronic device or portable container in the portal may trigger a signal to be sent. This signal can include, but is not limited to including, an alarm, information to an external device, a voice notification, displayed information, and more.

Portals, portable electronic devices, and portable containers can be used in a number of ways together or distinct from each other to provide an enhanced shopping experience, automate payment and checkouts, provide for security if items, provide for security of information, provide data on location of object and items, and more. The examples contained herein provide for the entirety of the scope of present invention, and one skilled in the art can recognize the extension of the inventions herein to additional applications. Thus, portals can define zones and subzones of locations, including retail stores and homes.

Portable electronic devices and containers may comprise an energy storage device. This device is often electrochemical in nature, such as a battery. The portable electronic device or container may need to be replaced, charged, or powered in the course of normal operation of portable electronic devices and containers. Provided herein are systems and methods of providing power to portable electronic devices and containers and/or the energy storage component therein. Means of charging a system may be provided by wired or wireless connection. Wired connection may include, but is not limited to including, AC and DC signals, USB, microusb, DC jack, and more. Wireless power transfer may include, but is not limited to including, induction, rectification, resonant inductive coupling, capacitive coupling, microwave, photonic, and more. Charging and power may be provided by portable means, at a predetermined location, or may be harvested by methods such as motion harvesting. As one preferred embodiment, a charging station will be present in a predetermined location. This charging station may define a portal. The charging station can be a rack, shelving, containers, a table, or more. There is further provided a method of an electronic mobile object: the energy storage device is powered by at least one electrical contact, the said electrical contact is on the strap of the mobile object, the mobile object is hung on a wire that provides an electrical contact with the strap, this powers the energy storage attached to the mobile object.

The portable electronic device and/or portable container may be associated with a user for an extended period of time. It may additionally only be associated with a user or retail environment for a predetermined or non-permanent session. Thus, it may be desirable to remove data collected on a given user at the end of a session. Thus, herein provided are systems and methods to ensure the security of user data. As one embodiment, by means of example, the presence of a portable electronic device or container associated with a user in a predetermined portal can trigger a signal to be sent to the portable electronic device or container, server, or others to erase, encrypt, or move user and session information. As an additional example, the selection of a feature of an application on an external device associated with the portable container can trigger a signal to be sent to the portable electronic device or container, server, or others to erase, encrypt, or move user and session information. As an additional example, the presence of a portable electronic device or container at a charging location or charging station may initiate the erasure or modification of user and/or inventory information, and may reset the portable container or device. This may be performed by means of the charging station comprising a portal. This may additionally be performed by the energy storage device receiving a charging current.

The portable container or device may have means of sensing the current charge status of the energy storage device. A signal can be sent to a display, indicator, or external device that communicates the level of charge of the device and if charging is necessary.

In some embodiments, if a portable electronic object or portable container determines that it has not contained any tags for a certain time period, the portable electronic object or portable container can send a signal to an external device associated with a store. The store can then send an employee to retrieve and charge the portable electronic object or portable container. The signal sent by the portable electronic object or portable container can give the location of the object or container.

A portable container describing a 3 dimensional volume may have additional zones defined within or external to the 3 dimensional volume. By way of example the portable container is a bag, the bag having 2 pockets. Each pocket is defined as a zone. It may be desirable to discern the location of a tag between the 2 zones of the bag. This can be accomplished by establishing multiple portals within the portable container, multiple portable containers within the first portable container, and other means. Shielding, software, interrogators, and readers can be used to define zones and subzones. There may be between 0 and 1 zone, 1 and 2 zones, 2 and 10 zones, and greater than 10 zones. Zones may be modified or redefined by software.

Portable containers and devices have been provided that may communicate with external devices. These external devices may be additional portable containers. The said communication establishes a mesh network.

The information gathered from portable electronic devices and containers and portals may be used in a number of ways, herein described. By means of additional example, the information may be useful in optimizing the layout of a retail store environment. Data that indicates the probability of a user purchasing an item, for example, based on location in the store defined by the presence of a portal may be used to determine the optimum location of items within a store. This discussion is not meant to be limiting of the utility of information gathered to defining the operation, layout, and inventory of a retail environment.

The invention of portable containers and devices enables novel means of establishing a checkout operation. It may be desirable for a portable container to be used by multiple users, and not removed from the store by a single consumer. The portable container may contain a second container substantially overlapping the 3 dimensional volume of the portable container. This second container may comprise a tag. The portable container can read the presence of this tag. During a shopping session, a user may place tagged items that he/she wants to buy into the second container (comprising the tag), which is disposed within the 3 dimensional volume of the portable container. At the end of the shopping session, the user may remove the second container from the portable container. When the second container is removed, the portable container may detect that the tag associated with the second container is no longer within the three dimensional volume. The absence of this tag may initiate or complete a checkout, payment, or point-of-sale operation. Thus, by means of example, the portable container is a bag, the bag contains a liner bag with a tag. The liner bag contains items with associated tags. Upon removal of the liner bag with the items inside, a checkout operation is performed for the items contained within the liner bag.

Additionally, checkout, payment, point-of-sale, advertisement, and other events may be initiated by the presence or absence of tags. By means of example, upon leaving a store an item may be dropped into the portable container. The item has an associated tag. The tag is read by the portable container and an inventory operation is performed. The presence of this tag initiates or completes a checkout process.

The present inventions provide systems and methods of portable containers and devices, portals, and store layouts that enable inventory management, point-of-sale, analytics, and more. There is additionally provided communication between portable containers and devices and external, often wireless, devices.

Thus, in general, and by way of example, there is provided in FIG. 1 a portable container 100. The portable container 100 may comprise an electronic energy storage device 101 powering a combined reader, interrogator, and transponder 102 (e.g., a portable electronic device) that interrogates with interrogating signal 103 the tag 104 placed inside or attached to the portable container 100 as part of or attached to an item 105. In response to the interrogating signal 103, the tag 104 may send, relay, and/or communicate information regarding the item 105 via the reader signal 108 back to the reader 102. The tag 104 may be an active tag that generates an electromagnetic signal using a power source. The tag 104 may also be a passive tag that draws power from the interrogating signal 103, and provides the reader signal 108 by passively modulating the interrogating signal 103. Although only one tag 104 is depicted, the portable container 100 may contain a plurality of tagged items, each of which may respond with a reader signal 108.

The portable container 100 may also comprise an adjunct processor and/or memory storage device that maintains an inventory of items within the portable container 100 based on received reader signals 108. This adjunct processor and/or memory storage device may be located at the portable container—for instance, they may be part of the combined reader, interrogator, and transponder 102, they may be part of one or more separate device(s) in communication with the reader via a wired or a wireless communication interface, they may be placed within the portable container, integrated into the portable container, or coupled with the portable container via a short range wired or wireless connection.

Information regarding the received reader signals may be transferred from the reader to the adjunct processor via a communication interface, which may be a wired or a wireless communication interface. For example, the communication interface may comprise a wired bus, a wired network connection, or a wireless connection such as a Bluetooth or NFC connection. This information may be transferred so that the detected response signals may be analyzed in order to determine whether the tags from which the reader signals are received are located within the portable container or outside the portable container. For example, the adjunct processor may use the timing and/or polling algorithms described in detail herein to attempt to detect all of the tags disposed within the portable container, as well as to distinguish whether detected tags are within the portable container or outside the portable container.

The combined reader, interrogator, and transponder 102 may also transfer all, a subset, or information derivative of the reader signals 108 to external device 106 via communication interface 107. Communication interface 107 may comprise a wired or a wireless communication link, as described herein. In some embodiments, instead of having a processor that is part of the reader/interrogator/transponder 102 maintain the inventory of items, an processor and/or memory storage device that is part of the external device 106 may be configured to maintain the inventory of items based on reader signals received by reader/interrogator/transponder 102. The external device 106 may be, for instance, a computer, a laptop, a server, a processing station, tablet, a mobile phone, a smart phone, any other mobile or non-mobile processing device, or any combination of the foregoing devices. In some embodiments, the external device 106 may store and/or execute software (e.g., an application) that receives and analyzes information regarding the detected reader signals in order to maintain the inventory of items, and to determine whether the items are within the portable container or outside the portable container. For example, the adjunct processor that is part of the external device 106 may also use the timing and/or polling algorithms described in detail herein to attempt to detect all tags disposed within the portable container, as well as to distinguish whether detected tags are within the portable container or outside the portable container.

The reader, transponder, interrogator, and energy storage device may together or separately comprise a portable electronic device. This portable electronic device may be removable, separable, distinct from, or integral to the portable container. Thus, by way of example, a portable electronic device can be placed within a container to define a portable electronic container.

The portable container 100 may produce sounds, visual signals, tactile signals, or vibrations that indicate readability of tags, and/or whether tags have been successfully read. The portable container 100 may transfer information to an electronic device (e.g., 106) to make a sound, visual information, tactile signal, vibration, or a combination thereof. This sound may be transferred to headphones, ear-buds, and other electronic devices. The portable container and/or the electronic device (e.g., 106) may also have a display that may flash, turn on, or display a static or changing image. This display may convey information regarding point of sales, checkout information, target analytics, target advertising, inventory, item information, consumer behavior, or relay related information.

The portable container 100 may contain a navigation circuit (not shown) as part of the electronics. For example, such a navigation circuit may be included as part of the combined reader, interrogator, and transponder 102. This navigation circuit may be a global positioning system or an indoor positioning system that interacts with transponders located throughout an indoor or outdoor space (e.g., Bluetooth, NFC, RFID, or other wireless transponders within an indoor or outdoor space) to enable the portable container 100, the wireless electronic device 106, and/or a remote server to determine the location of the portable container 100. This positioning information may be sent to an electronic device, such as wireless electronic device 106, and/or a remote server (not shown).

The portable container 100 may additionally include circuitry and/or interfaces for determining an identity associated with a user, and to associate the device with the user. For example, the combined reader, interrogator, and transponder 102 may communicate with wireless electronic device 106, which may provide the portable container with an identity of the user (e.g., a user name, or unique serial number that can be used to identify the user). The combined reader, interrogator, and transponder 102 may be configured to establish a user session (e.g., pair) with the wireless electronic device 106 via a wireless communication link (e.g., Bluetooth, NFC). The user identity may identify a real name of the user, or may be an anonymous user identity that uniquely identifies a user for record keeping purposes, but provides no personal information about the user (e.g., the user's real name). Information sent over any wireless communication link may be encrypted. The portable container, and/or reader/interrogator/transponder 102 may also comprise a scanner or reader configured to scan or read media containing user information, including but not limited to, credit cards, debit cards, store loyalty cards, RFID tags, and/or NFC tags. The portable container may also comprise a biometric sensor configured to measure a biometric signature associated with the user (e.g., a fingerprint scanner), and/or a user interface that allows a user to provide login information (e.g., a username and/or a password). The portable container may communicate with wireless electronic device 106 and/or a remote server (not shown) to access an online profile of the customer in order to determine an identity of the user, or to update a user's preferences, purchase history, or other information. The user interface may also allow a user to perform other functions, such as call for help or store assistance.

The portable container may comprise the colors of white, blue, black, brown, orange, yellow, red and a combination thereof. The portable container may be packaged in a plastic, metal, paper, linen, textile, glass, tape or a combination thereof. The portable container packaging may have an insignia, image, pattern, writings, advertisement, avatar, symbol, or related object; and this can be a single color or combination of colors. The portable container may have a hook, magnet, pin, or related object.

In some embodiments it may be desirable to use timing algorithms to determine when interrogator, reader, transponder and other signals are sent or received, and to interpret the sent or received information. Timing algorithms may specify that certain actions, such as the sending of interrogation signals, scanning for reader signals, and/or sending of transponder signals, be performed within a range of nanoseconds to microseconds, microseconds to milliseconds, milliseconds to seconds, seconds to minutes, and above. Timing algorithms may be used for a number of reasons. Of primary interest are optimizing the functionality of a portable electronic device or container. One critical aspect of performance is lifetime between charging. Sending and receiving signals may consume energy stored in an energy storage device. Minimizing the amount of energy used to read effectively is of value. Timing algorithms may be used to only send interrogation signals or receive reader signals at predetermined times, or as controlled by a user or software program. Thus, by means of example, a signal may not be on 100% of the time. Timing algorithms may additionally be used to determine information about location of tags within a predetermined 3 dimensional volume. By means of example, an interrogating signal may be sent at time x, and a reader signal may be received at time x'. The difference between time x' and time x may be used to determine the distance between the interrogator, reader, and tag. Antennas may be powered or active at the same, different, or at predetermined intervals. The said portable electronic device or container may additionally be always on. An external device may signal an interrogation or reader signal event.

Timing algorithms may also be critical to the functionality of a portable electronic device or container. If signal intervals are too short, or too infrequent, misreading, poor reading, or suboptimal inventorying can occur. This can be due to insufficient rectification in a tag, for example. Thus, it is desirable for signals to be sufficiently long and frequent to accurately record inventory information.

Additional algorithms, such as polling algorithms, may be used during operation of portable electronic devices and containers. Some readers, such as RFID readers, are not 100% accurate. Consequently, it can be a challenge to detect the presence of a tag located within the interior volume of a portable container, as well as confirming whether a received response signal is originating from a tag that is within the interior volume or outside the interior volume. By using a predetermined algorithm, the presence or absence of tags can be confirmed, and/or detected response signals can be verified to be within the interior volume or outside the interior volume. By means of example, an interrogator signal may be sent 5 times per second (the interrogator frequency). A reader signal may be received 5 times per second (the reader frequency). In this embodiment, over 2 seconds, 10 interrogation and reading signal events may occur (the signal count). If a tag is read more than 5 times (the positive value) in the 10 signal events, it shall be considered to be present in the predetermined 3 dimensional volume of the portable container or device, and can be added to an inventory of items describing the contents of the portable container. If a tag is read less than 5 times (the negative value) it shall not be considered to be present. If a tag is currently in inventory, but is not read for 5 consecutive signal events (the absence value), it will no longer be considered to be present and will be removed from inventory. This example is by no means limiting. Interrogator frequencies can range from 0 to 10 times per second, 10 to 100 times per second, 100 to 1000 times per second, and greater than 1000 times per second. Interrogator frequencies can additionally range from 0 to 1 time per minute, 0 to 1 time per 10 minutes, 0 to 1 time per hour, and longer. Reader frequencies can range from 0 to 10 times per second, 10 to 100 times per second, 100 to 1000 times per second, and greater than 1000 times per second. Reader frequencies can additionally range from 0 to 1 time per minute, 0 to 1 time per 10 minutes, 0 to 1 time per hour, and longer. The signal count (e.g., the number of interrogation and reading signal events that is kept in memory and analyzed) can be between 1 and 5, 5 and 10, 10 and 25, 25 and 100, and greater than 100. The positive value (e.g., the number of positive reads of a tag that is required before a tag is added to the inventory of items) can be between 0 and 1, 1 and 5, 5 and 10, 10 and 25, 25 and 100, and 100 and greater. The negative value (e.g., the number of negative reads of a tag that can cause a tag to not be added to the inventory of items) can be between 0 and 1, 1 and 5, 5 and 10, 10 and 25, 25 and 100, and 100 and greater. The absence value (e.g., the number of consecutive signals for which a tag is absent before the tag is removed from inventory) can be between 0 and 1, 1 and 5, 5 and 10, 10 and 25, 25 and 100, and 100 and greater. In some preferred embodiments, the interrogator frequency is between 1 and 10 times per second, the reader frequency is between 1 and 10 times per second, the positive value is between 1 and 10, the negative value is between 1 and 5, and the absence value is between 1 and 5. In some cases, these interrogator frequencies, reader frequencies, positive values, negative values, and/or absence values can appropriately balance the need for power conservation as well as for accurate reading of tags within the container.

The portable container 100 described in FIG. 1 may optionally include one or more shielding elements that comprise shielding material. The shielding material may include a metal to reflect electromagnetic signals, a material with high water content to absorb the signal, and/or other related materials to either attenuate, absorb, modify, and/or reflect such electromagnetic signals. Such materials can include, but are not limited to, metals, semiconductors, insulators, plastics, dielectrics, ceramics, composites, active media, nanomaterials, micromaterials, and more. The shielding can be specific to a particular wavelength range, such as 120 to 100 nanometers, 100 to 1000 nanometers, 1 to 10 microns, 10 to 1000 microns, 1 to 10 millimeters, 10 to 100 millimeters, 100 to 1000 millimeters, 1 meter and 10 meters, and greater than 10 meters. The shielding may be printed onto all or part of the portable container 100, placed on a liner disposed within the portable container, on part of a pocket, on straps of the portable container, and on accessories of the portable container.

The shielding material can be used to enhance the accuracy of the interrogator/reader/transponder 102 in inventorying the contents of portable container 100. For example, the shielding material can be attached to the housing of the portable container such that it defines at least part of the interior volume of portable container 100. In some embodiments, the shielding material can cover less than 10%, between 10-25%, between 25-50%, between 50-75%, or between 75-100% of the interior volume of portable container 100. The shielding material can be placed and configured to at least partially inhibit the interrogation signals 103 from propagating outside the interior volume. The shielding material can also be placed and configured to at least partially inhibit interrogation signals from other interrogators (e.g., interrogators from other portable containers—not shown) from propagating into the interior volume. The shielding material can also be placed and configured to at least partially inhibit the reader signals 108 from propagating outside the interior volume. The shielding material can also be placed and configured to at least partially inhibit reader signals from tags located outside the interior volume from propagating into the interior volume, or from being detected by the interrogator/reader/transponder 102. The shielding material can be configured to affect certain wavelengths more than others. For instance, the shielding material can block, absorb, attenuate, or reflect interrogation signals more effectively than reader signals, or vice versa.

In some embodiments, the shielding material can also be configured to reflect either interrogation or reader signals in order to aid in reading tags placed within the portable container. For instance, one potential problem with obtaining an accurate read is that a single interrogator placed within the portable container may not be able to effectively reach all parts of the portable container with interrogation signals, especially if there are one or more items within the portable container that comprise metal or water-rich components that can block or absorb interrogation signals, and prevent the interrogation signals from reaching other items. Similarly, tags that emit reader signals may not necessarily be detected by the reader if there are items within the portable container that block the reader signals' path. By providing shielding material that reflects interrogation signals and/or reader signals around within the interior volume of the portable container, interrogation signals from an interrogator and/or reader signals from one or more tags can more easily reach all parts of the portable container. This can increase the likelihood that an interrogation signal can reach all tagged items disposed within the portable container, and that a reader signal from all tagged items can reach the reader.

Figure 2:
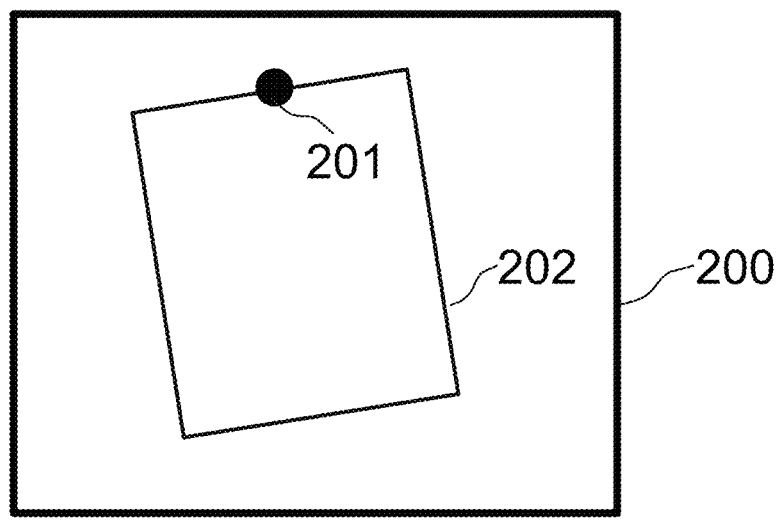
FIG. 2 depicts exemplary methods of attaching a portable electronic device to a portable container, according to some embodiments.

FIG. 2 illustrates a reader 202 affixed to portable container 200 by an attachment object 201, according to some embodiments. The said attachment object may include but is not limited to a male component of a fastener, a female component of a fastener, stitches, a mechanical attachment, a magnetic connection to the mobile object, a clasp, a zipper, a button, tape, glue, Velcro, a screw, a pin-in-socket, an electrical contact, and more. The attachment object may affix the reader to the portable container in a pocket, to a pocket, in the liner of the mobile object, to a predetermined location, or on a predetermined material, component, or section. The reader may be attached to material including, leather, suede, cotton, linen, polyester and blends, rayon, silk, tapestry, velvet and velveteen, fur, faux fur, plastic, ceramic, semiconductor, metal, textile, screen printed material, and more. The portable container 200 may be a tote, a purse, a handmobile object, a plastic object, a paper object, a wooden object, a metal object, a clutch, a shopping bag, a shopping cart, a box, a personal bag, or a combination thereof. The portable container 200 may be considered a user-portable container in that it can easily be carried or maneuvered by one or more humans of average strength and dexterity. The components of the reader may be printed onto a material including but not limited to leather, suede, cotton, linen, polyester and blends, rayon, silk, tapestry, velvet and velveteen, faux fur, plastic, ceramic, semiconductor, and metal, and affixed by the said attachment object to the portable container. The portable container may be a bag that is placed inside a tote, a purse, a handmobile object, a plastic object, a paper object, a wooden object, a metal object, a clutch, a shopping bag, a shopping cart, a box, a personal bag, or a combination thereof. The reader 202 may comprise hardware components including one or more analog circuits, AC/DC converters, AC adapters, micro-controllers, processors, system interfaces, digital circuits, antennas. The reader 202 may also comprise wires attached to the portable container 200, to a liner of the portable container 200, and/or to a pocket of the portable container 200. The wires may be adhesively attached to the portable container 200, stitched to the portable container 200, printed to the portable container 200, and/or magnetically coupled to the portable container 200. The said reader 202 may be attached to material including, leather, suede, cotton, linen, polyester and blends, rayon, silk, tapestry, velvet and velveteen, faux fur, ceramic, semiconductor, plastic, and metal. The reader 202 may comprise any desired shapes including but limited to a cylinder, a planar/thin film, a box, and/or a rectangle. The reader 202 may also be flexible. The reader may further have a predetermined modulus, yield strength, and geometry.

Figure 3:
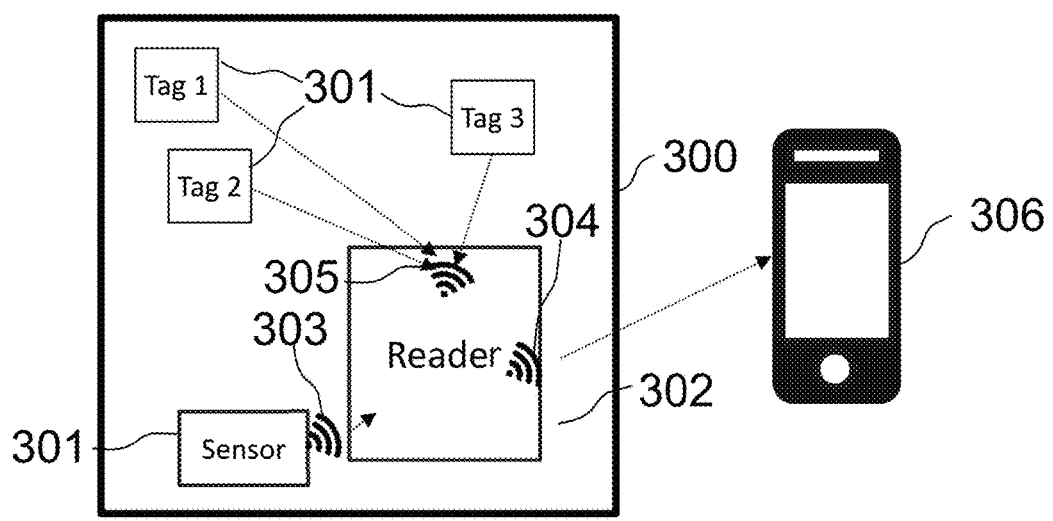
FIG. 3 depicts an exemplary portable container having an associated sensor, according to some embodiments.

As illustrated by way of example in FIG. 3, a portable container 300 may have a sensor 301 that communicates with the reader 302. The reader may receive reader signals 305 from a plurality of tags 307. The sensor 301 may send a signal 303 to the reader 302; based on the signal 303, the reader 302 may in turn send signal 304 to the wireless electronic device 306. Signal 304 may comprise all or part of signal 303, and/or information derived from signal 303. The signal 303 may be wireless or wired. Sensor 301 may comprise one or more sensors configured to determine information regarding tags 307, items to which tags 307 are affixed, or a current status or attribute of portable container 300. This information may include but is not limited to global positioning/navigation (e.g., the current position of the portable container); ambient temperature/weather; and weight, spectral characteristics, acoustic characteristics, density, and/or chemical characteristics related to the tags 307 and/or the items to which tags 307 are affixed. The sensor may be separate or may be part of the portable container. This information of the sensor is sent to the reader 302, which additionally acts as a transponder. The reader 302 may communicate with an external electronic device 306 via a wired or wireless communication link. If the reader 302 communicates with device 306 via a wireless communication link, the link may use a wavelength range different from a wavelength range used by signals 303 and/or 305. The external electronic device 306 may also communicate with other electronic devices using various communication methods, including but not limited to, a local area network (LAN) a wide area network (WAN), beacons, a cellular network, and more.

The reader may have a profile between 0.25 and 1 in^2, 1 and 10 in^2, 10 and 100 in^2, and greater. The reader may have a volume of between 0.001 and 0.1 in^3, 0.1 and 1 in^3, 1 and 10 in^3, and greater. The reader may comprise materials including, but not limited to, metal, semiconductor, plastic, ceramic, insulator, and glass.

The reader 302 may contain multiple paired antennas for both interrogating and reading the signal. Multiple antennas may be placed in the mobile object. A single antenna may be placed outside the portable container and placed in the portable container. Multiple antennas may be placed both in the portable container and outside the portable container. The antennas may be wearable on the external wireless device. The antennas may include directional and omni-directional antennas.

Figure 4:
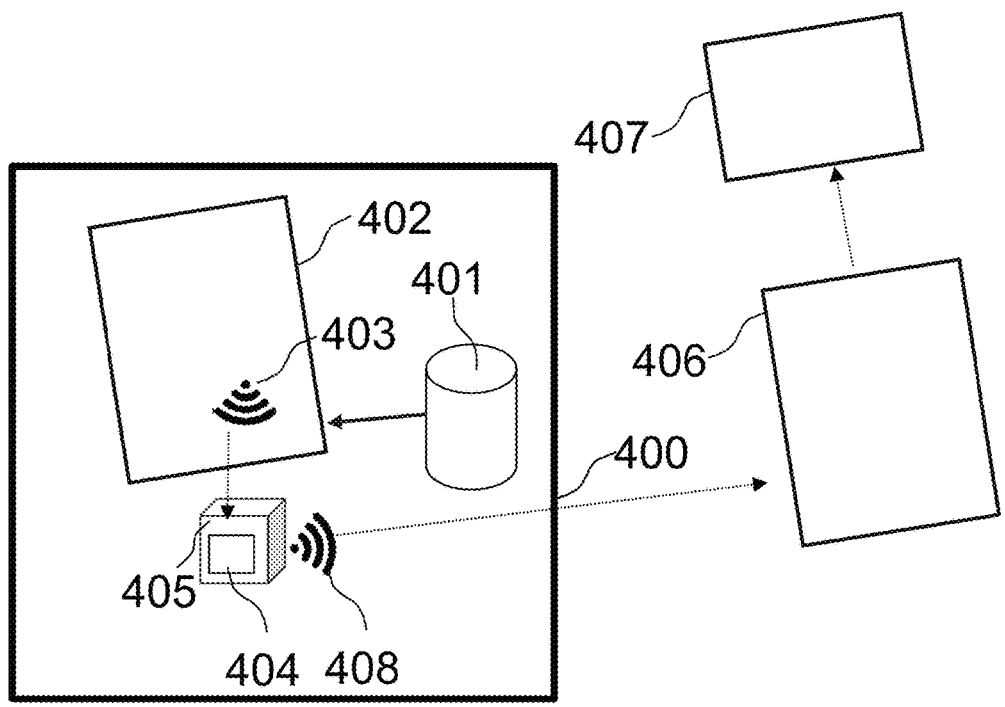
FIG. 4 depicts an exemplary portable container with a reader located outside the portable container, according to some embodiments.

As illustrated by way of example in FIG. 4, the reader may be external to the portable container. The portable container 400 may comprise an energy storage device 401 that powers an interrogator 402 within the container 400. The interrogator sends an interrogation signal 403 to tags 404 associated with items 405. The tag sends or relays a reader signal 408 to the reader 406, wherein the reader 406 is not contained within the predefined 3 dimensional volume of the bag whereby tags will be read. The reader may additionally send information to an electronic device 407. The electronic device may be wireless. The reader may have at least one antenna for communicating with electronic device 407, one antenna for reading, or a combination thereof. Each antenna may further provide a dual energy range. The energy transmitted by the interrogator and/or reader may be an electromagnetic signal in a certain wavelength range, including without limitation, the RFID, WiFi, RF, UHF, HF, and LF Broadband spectrums, among others. The electromagnetic signal may also include electromagnetic radiation in the visible, infrared, ultraviolet, radiowave, and/or microwave spectrum, among others. Reader 406 may be communicably coupled with device 407, and device 407 may be connected to other devices (not shown) via a local area network (LAN), a wide area network (WAN), beacons, a cellular network, and more. The external electronic device 407 may also be communicably coupled with other readers and/or interrogators (not shown) via a wired or wireless communication link.

The interrogator and reader signal may be of substantially different wavelengths, or of substantially similar wavelengths. The portable container 400 may additionally comprise shielding. This shielding may be configured in such a way as to allow reader signal 408 to exit the predefined 3 dimensional volume while at least partially inhibiting interrogation signal 403 from propagating outside the predefined 3 dimensional volume. By way of example, the portable container may be a 5 sided box, with the top open. Interrogator 402 may be oriented in such a way that no part (or only a relatively small part) of the interrogation signal 403's field of view is accessible via the opening in the box. The 5 sides may be shielded with a material that is capable of at least partially reflecting and/or absorbing the interrogation signal and/or reader signal 408. The reader signal 408 may be oriented in such a way as to substantially or partially escape the predefined 3 dimensional volume through the opening in the box. For example, the tags 404 may be configured to generate an omnidirectional reader signal 408, such that at least a portion of the reader signal escapes through the opening in the box. This reader signal can then be detected by reader 406. As another example, reader signal 408 may operate within a first wavelength range, while interrogation signal 403 may operate within a second wavelength range. The shielding may be configured to allow signals within the first wavelength range to pass through, while blocking, reflecting, absorbing, attenuating, or otherwise modifying signals within the second wavelength range. In this way, the shielding may at least partially prevent interrogation signal 403 from exiting the three dimensional volume defined by container 400, while allowing reader signal 408 to exit the three dimensional volume.

Figure 5:
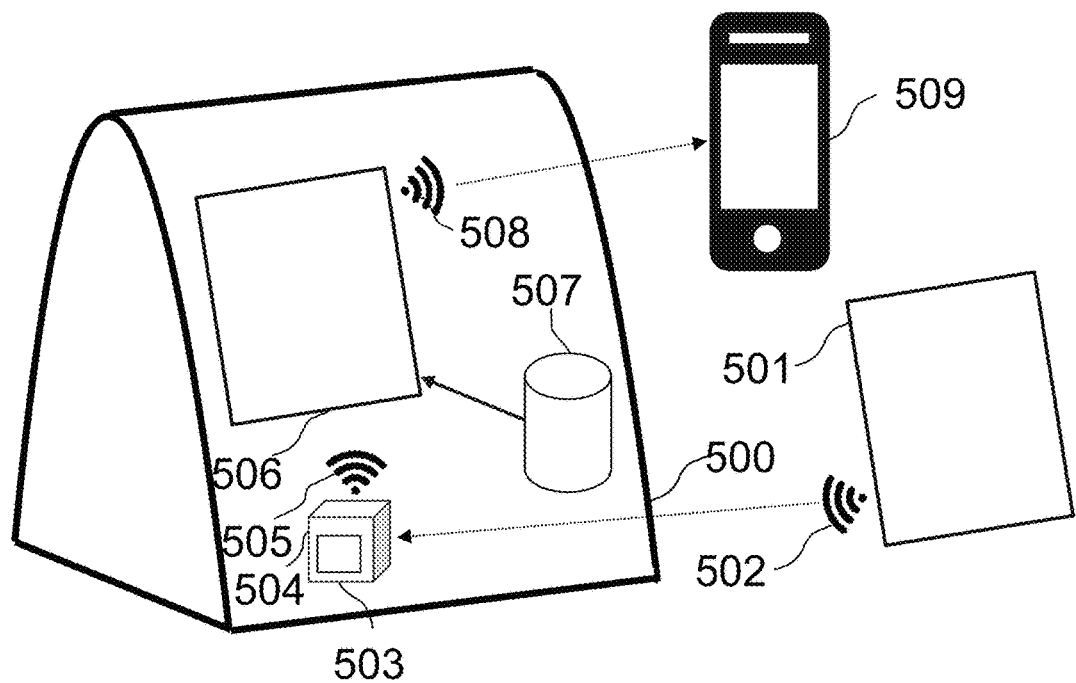
FIG. 5 depicts an exemplary portable container having an interrogator located outside the portable container, according to some embodiments.

As illustrated by way of example in FIG. 5, the interrogator may be external to the portable container. The portable container 500 comprises an energy storage device 507 that powers a reader 506. An interrogator 501 located outside the portable container sends an interrogation signal 502 to tags 503 associated with items 504. In response to the interrogation signal 502, the tag sends, relays or provides a reader signal 505 to the reader 506. The reader may additionally comprise a transponder and send information to an electronic device 509 by transponder signal 508. The electronic device 509 may be wireless. Although the interrogator 502 and the device 509 are depicted in FIG. 5 as separate devices, in some embodiments, the two devices may be integrated into a single device. The energy transmitted by the interrogator and/or the reader may be an electromagnetic signal that is in the RFID, WiFi, RF, UHF, HF, and/or LF Broadband spectrum, among others. The electromagnetic signal may also include radiation in the visible, infrared, ultraviolet, radiowave, and/or microwave spectrum, among others. The device 509 and/or interrogator 501 may communicate with other devices (not shown) via a wired connection, a wireless connection, a local area network (LAN), a wide area network (WAN), beacons, a cellular network, and/or other communication methods.

The interrogation signal 502 and reader signal 505 may be of substantially different wavelengths, or of substantially similar wavelengths. The portable container 500 may additionally comprise shielding. This shielding may be configured in such a way as to allow an external interrogator signal to enter the predefined 3 dimensional volume while at least partially inhibiting any reader signal from propagating outside the predefined 3 dimensional volume. By way of example, the portable container may be a 5 sided box, with the top open. The reader signal may be oriented in such a way that no part of the signal's field of view is accessible via the opening in the box. The 5 sides may be shielded with a material that is substantially reflective or absorptive of the interrogating and/or reader signal. The interrogator signal may be oriented in such a way as to substantially or partially enter the predefined 3 dimensional volume through the opening in the box. As another example, interrogation signal 502 may operate within a first wavelength range, while reader signal 505 may operate within a second wavelength range. The shielding may be configured to allow signals within the first wavelength range to pass through, while blocking, reflecting, absorbing, attenuating, or otherwise modifying signals within the second wavelength range. In this way, the shielding may at least partially prevent reader signal 505 from exiting or penetrating into the three dimensional volume defined by container 500, while allowing interrogation signal 502 to penetrate into the three dimensional volume. The shielding may also at least partially inhibit reader signals from tags located outside the interior volume from propagating into the interior volume, and/or from being detected by reader 506. In this way, the shielding may enhance the accuracy of the read obtained by reader 506.

Figure 6:
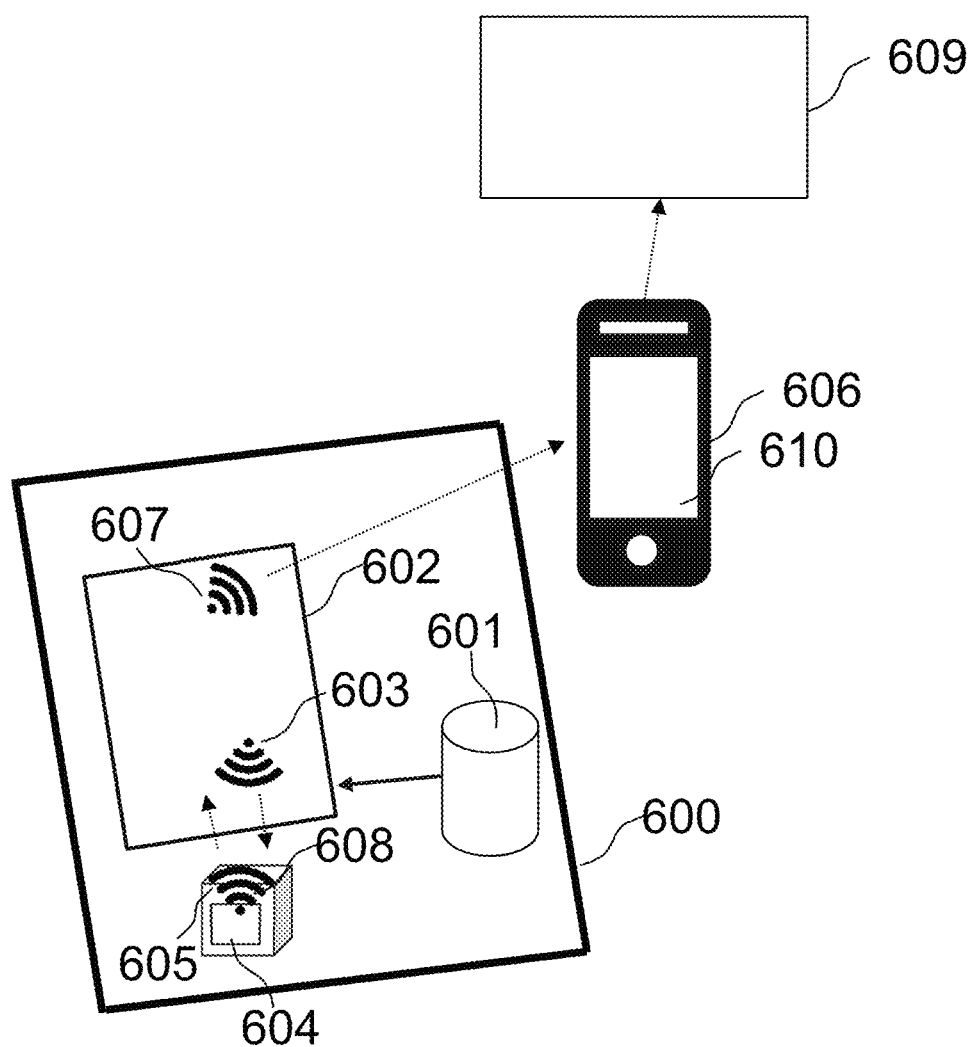
FIG. 6 depicts an exemplary portable container in communication with a wireless device, which is in turn in communication with a second external device, according to some embodiments.

By way of example there is provided in FIG. 6 a portable container 600. The container 600 may comprise an electronic energy storage device 601 powering a combined reader, interrogator, and transponder 602 that interrogates with interrogating signal 603 the tag 604 placed inside or attached to the portable container as part of or attached to an item 605; where this tag sends, relays, or communicates information (the reader signal) 608 back to the reader; where all, a subset, or a derivative of this information is transferred to a wireless electronic device 606 by an electromagnetic signal (the transponder signal) 607. All, a subset, or a derivative of this information is then communicated from wireless electronic device 606 to an external device 609. The external device 609 may include a server, database, smart device, computer, and more. The external device 609 may communicate information to the wireless electronic device 606. The electronic device may comprise a display 610. The electronic device 606 and/or the external device 609 may be configured to maintain an inventory of items disposed within the portable container 600. The information relayed to the external device 609 may also be used by the external device 609 in various ways. For example, the external device 609 and/or wireless electronic device 606 may implement an automatic checkout procedure, whereby a total dollar amount associated with the inventory of items is computed, the dollar amount is presented to the user for confirmation, and, when confirmation is received, the dollar amount may be automatically deducted from a bank account, credit card account, or other payment account associated with the user.

For systems of the general type described herein, the tag may be an active tag powered by an energy storage device attached to, affixed to, or affiliated with the tag, and/or the portable container. The tag may be passive, wherein the interrogating electromagnetic energy powers and/or interacts with the tag. The interrogator may turn the tag on or off using a defined signal if the tag has the built-in capability to be turned on. In embodiments using a passive tag, references herein to generating, sending, transmitting, or otherwise providing a reader signal that can be detected by a reader should be understood to refer to a modulation of the phase, amplitude, and/or frequency of an interrogation signal provided by an interrogator. Tags may also be programmable. For instance, the tag may be programmed by the reader and/or interrogator to transmit or to not transmit when the tag is interrogated by an interrogator, or when the tag is exposed to a specific interrogation signal.

The tag may be serial read with an electronic code of 32-bit, 56-bit. The tags may comprise up to 4 Kilobytes of writable data. The tags signal may have a cryptographic authentication code. The wireless device may be use P2P communication. The tag may comprise the ability to interact with signals relating to RFID, NFC, UHF, LF, HF, WiFi, Bluetooth, BLE, Zigbee, Z-wave, and more. The mobile object may contain items that do not have tags affixed to them.

For systems of the general type described herein, the energy storage device may be at least one battery including but not limited to, lithium ion, metal-air, nickel metal hydride, alkaline battery, electrochemical and flow battery. The battery may be primary or secondary. The energy storage device may include at least one capacitor. The energy storage device may be powered by an electrical wire contact, by means of wireless induction, magnetic resonance, and rectifying antenna or a combination thereof. The energy storage device may be charged by an external charger through a USB cable. The electronic energy storage device may be connected to a reader, interrogator, and/or transponder by electrical wire. The energy storage device may power the reader, interrogator, and/or transponder wireless by means of induction, magnetic resonance, and rectifying antenna. The electronic energy storage device comprising of more than one battery is in series, parallel, independent and a combination thereof.

The said electronic energy storage device may be powered by photovoltaics, motion energy harvesters, and thermal energy harvesters. The energy storage device may be powered by an external electronic device. The portable electronic device or container may contain its own charger connecting electronic components to the device. The charger may include circuitry capable of AC/DC conversion, DC/DC conversion, signal filtering including but not limited to linear filtering, non-linear filtering, time-invariant filtering, time variant filtering, analog filtering, digital filtering, discrete-time filtering, continuous-time filtering, passive filtering, active filtering, infinite impulse response filtering, finite impulse response filtering and any combination thereof. The charger may also comprise a surge protector.

The portable container may be a bag, a box, a cart, a plastic mobile object, and more. The portable container may have a mass between 10 and 100 grams, 100 and 1000 grams, 1000 and 10000 grams, 10 kilograms and 100 kilograms, and 100 kilograms or more. The portable container may have a profile between 5 and 10 in^2, 10 and 100 in^2, 100 and 1000 in^2, and greater than 1000 in^2. The portable container may have a volume of between 5 and 10 in^3, 10 and 100 in^3, 100 and 1000 in^3, 1000 and 10000 in^3, and greater than 10000 in^3. The portable container may have a hollow volume of between 1 and 10 in^3, 10 and 100 in^3, 100 and 1000 in^3, 1000 and 10000 in^3, and greater than 10000 in^3. The portable container may comprise materials including, but not limited to, plastics, ceramics, metals, semiconductors, textiles, fabrics, organic materials, composites, polymers, insulators, glasses, and more. The portable container may be configured to be used between 0 and 10 times, 10 and 100 times, 100 and 1000 times, 1000 and 10000 times, and greater than 10000 times. The portable container may have one or more handles. In some embodiments, the portable container may be user-portable in that it may be handled, moved, or maneuvered relatively easily by one or more humans of average strength and/or dexterity.

The portable container, or predetermined components therein, may be resistant to water or be waterproof. The portable container may be dust proof, resistant to UV, resistant to predetermined chemicals, antimicrobial, resistant to corrosion, resistant to tampering, and resistant to theft. The portable container may communicate information regarding status of the energy storage device, functionality of reader or interrogator or other components, or other predetermined information. This information may be used to check on the functionality of a deployed portable container.

The portable container and components therein, possibly including, but not limited to, the reader or interrogator, may comprise a memory storage device configured to store data, software, and/or firmware. This software may be modified by a remote signal. This memory may be reprogrammed according to a predetermined set of conditions relating to the components of the bag. The portable container may be attached to, affixed to, or associated with a reader configured to read media containing or referencing customer-specific or item-specific information. By means of example, but by no way excluding other embodiments, an electronic credit card reader may be associated with, or affixed to the portable container. This card reader may be in wireless or wired communication with the reader or an external wireless system which can communicate with an enterprise system.

The portable container may contain a bag, container, or other removable element that can hold items. This element may be attached or affixed to the portable container by means of a fastener, zipper, button, Velcro, mechanical attachment, magnetic field, or other attachment means. The portable container may have an associated transponder element that stores wirelessly readable information. This transponder element may be an active or passive RFID tag, or other information-containing elements that are readable by wireless signals. This transponder element may be used to identify the portable container, or to identify the location of the portable container. The portable container may have an ID number stored digitally and/or in an analog format.

A portable container may communicate information to one or more wireless electronic devices, including but not limited to cellular phones, tablets, mobile gateways, wifi hubs, computers, and more. Multiple mobile electronic objects may connect to the same wireless electronic device, including but not limited to cellular phones, tablets, mobile gateways, wifi hubs, computers, and more. These external devices may receive, process, display, edit, and/or store information received from the portable device using an application based on a Software Development Kit to record the data. The data may be used in part in an API.

Figure 7:
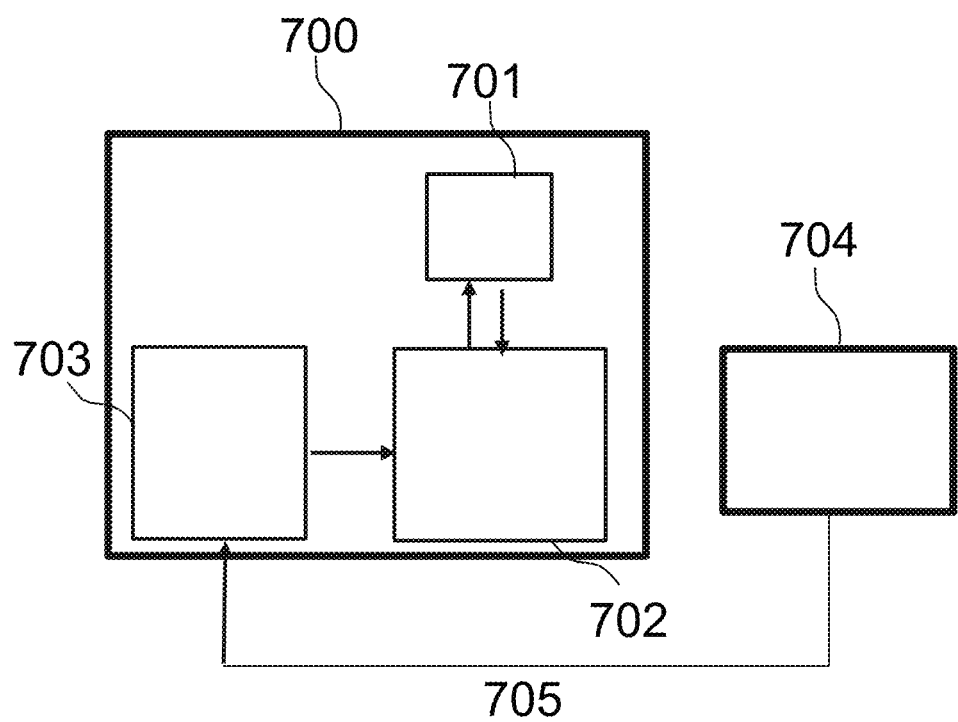
FIG. 7 depicts an exemplary portable container having a charging connection, according to some embodiments.

As illustrated by way of example in FIG. 7 a portable container 700 comprises an energy storage device 703 that provides power to an electronic component 702 in communication with tags 701. Power, 705, is provided to the energy storage device 703 by a charger 704. The power may be transferred via one or a plurality of wires or wirelessly. There may be one or more electrical contacts associated with the electronic component 702 and/or the energy storage device 703. The charger 704 may be a rack, a table, a shelf, a wire, or more. The power may be AC or DC power. The power may be communicated via induction. The electrical contacts may be present on a predetermined feature of the portable electronic device, such as a handle or a plug. The portable electronic device may need to be in a certain position relative to the charger. A switch may be present to enable charging.

Identifying the location of one or more portable containers, and the items and users associated therewith, may be desirable, particularly in a store environment. There are several provided means of accomplishing this location identification, or positioning. The first is by the presence of portals. Portals may comprise devices or components that define a 3 dimensional volume and/or a two dimensional surface with a fixed or mobile location, and an interaction between a portable container with a portal may define the location of the portable container. The second provided means is that the portable container may comprise a navigation component, the component identifying the location of the portable container and communicating this information to an external electronic device, such as a mobile phone or a server. An example of a navigation component includes one or more GPS receivers that determine the location of the navigation component (and the portable container of which it is a part) via GPS technology. Another example of a navigation component includes one or more WiFi transponders, Bluetooth transponders, RFID tags, wireless tags, and/or magnetic field detectors. The navigation component may interact with one or more transponders located throughout a space (such as an indoor or outdoor environment, including without limitation a retail store, a supermarket, a shopping mall, an airport terminal, etc.) to determine the navigation component's location. For instance, the transponders located throughout the space may have known fixed or mobile locations, and may be configured to detect location signals produced by the navigation component. By evaluating the location of the transponders that detect the location signals, the direction from which location signals were detected by one or more transponders, and/or the signal strength of location signals detected by one or more transponders, a processor communicably coupled to the transponders (e.g., a processor that is part of a server, or that is coupled with and/or located at the navigation component that is part of the portable container) can determine the location of the portable container. In some instances, the navigation component affixed to the portable container may be a passive tag that produces location signals in response to location polling signals produced by the transponders located throughout the space—in some cases, the passive tag may produce the location signals by modulating the location polling signals. Using such transponders may be preferable to GPS technology, or may be a useful addition to GPS technology, when determining the position of a portable container within an indoor space where GPS reception may be comparatively weak. The third provided means may be a wired or wireless connection between a portable container and an external electronic device. This device may be a mobile phone. The external electronic device may substantially covary in position with the user and with the portable container, such that the position of the portable container and/or the user may be estimated by determining the position of the external electronic device. The external electronic device may have a navigation component similar to the types of navigation components discussed above. Any or all of these means may be used in combination to provide a positioning system configured to determine the location of the portable container. For all provided means, the location information may be processed, and more specifically may be processed by a server, a mobile device, an internal processor, or by other processing elements located within or external to the portable container.

The location of a portable container, user, and associated items can be useful to consumers, retailers, and marketers, for example. The systems and methods provided herein provide for a previously unobtainable resolution of data collection and utilization, targeted marketing and assistance, inventory management, and more. By means of example, the location of a portable electronic container may be monitored with a resolution of 2 to 12 inches, 12 to 36 inches, 36 to 100 inches, 100 to 360 inches, 30 to 50 feet, 50 to 100 feet, and 100 feet or more. The timing of changes in the portable container's location, and/or the times at which items are added and/or removed from the portable container, may be determined with a time resolution of 1 to 1000 microseconds to 1 to 1000 milliseconds, 1 to 10 seconds, 10 and 1000 seconds, and more than 1000 seconds. In some embodiments, the time resolution is between 0.1 and 10 seconds and the location resolution is between 1 and 3 feet.

Information about the location of a portable container, a user, and items may be stored, processed, and communicated. The information may be stored in a memory storage device located at the portable container. The information may be stored on an external electronic device, such as a mobile phone, connected with the portable container via a wired or a wireless communication interface. The information may be stored externally on a server, on a computer, on a smart device, on a tablet, or on another electronic device located at a different location than the portable container. By means of example, information about the temporal and spatial profile of a user, a portable container, and an inventory can be stored on a local storage device comprising a portable electronic device associated with a portable container. Upon the detection of the portable container within, on, or close to a predefined portal in a store, the information may be transferred to a server via a transponder. The information may be encrypted. By means of additional example, a wireless mobile device (e.g. a smartphone) may be associated with the portable container. The information of the temporal and spatial profile of a user, a portable container, and an inventory may be stored on the wireless mobile device. By further means of example the information of the temporal and spatial profile of a user, a portable container, and an inventory may be communicated via transponder to an external database without being stored for extended periods of time on a storage device associated with the portable container.

The methods and systems provided herein therefore enable the creation of a user history. This user history can comprise a single visit to a store, a series of visits to the same store, or the same brand of store, a series of visits to multiple stores (potentially associated with different brands), and online shopping history in conjunction with in-store shopping history. This user history can comprise information about items placed within or removed from a portable container at different points in time, the location of a user at different points in time, the location of a portable container at different points in time, and more.

By means of example a sample user history in space and time is provided: A use enters a store and receives a portable container. The portable container is associated with the user by means of a mobile wireless device, e.g. a smartphone, pairing with the portable container at 12:00:00. The user takes the handmobile portable container into a first area of the store at 12:00:15, the first area being a men's apparel section. The user goes up to a display with men's jeans at 12:00:20 and puts a pair of blue jeans of model X and of size Y. The user then visits the shoes department at 12:02:10, goes up to a display of sandals that are marked on sale at 12:02:30, and puts a pair of size Z sandals of model A into the portable container at 12:04:16. The user proceeds to an additional display of sandals at 12:04:35, not shown to be on sale, removes the sandals of size Z of model A from the portable container at 12:05:15 and replaces them with sandals of size Z of model B at 12:05:17. The user then proceeds to the zone defined by jewelry at 12:06:10, but does not add anything into the portable container. The user then proceeds to a zone defined to be a changing area at 12:15:12. The jeans of model X and of size Y are removed from the portable electronic container. They are not returned, but are determined to be present in a predefined portal associated with the changing area. Still in the changing area, a pair of jeans of model X and size Y' are placed into the portable container. The user then proceeds to a portal associated with the exit to the store. A checkout event is initiated and the user leaves the store with a pair of jeans of model X and size Y' and a pair of sandals of size Z and model B located within a liner bag that was previously substantially contained within the portable container.

This example demonstrates a subset of the sort of information obtainable from the provided systems. The data can be useful for several purposes including, but not limited to, the following. First, information about the user, user preferences, and user inventory can be obtained. As an example, from the example above, the user's size in jeans can be determined to be Y', and not Y. Further, from the example above, the user is understood to exhibit a preference for sandals of model B above sandals of model A. However, the user was seen to be drawn to the on-sale display associated with sandals of model A. Still further, the user can be determined to have possible interest in the purchase of a jewelry item. From this and other obtainable user preference and user information, a variety of utilities can be realized for both the user and the store. By means of example, without limiting the potential utility of this information, a store may be able to provide targeted advertising to the user. Furthering the above example, and leveraging the information that the user may have potential interest in a jewelry purchase, the user may be provided with information on jewelry inventory, or a coupon that provides a discount to the price of a predetermined set of jewelry items. This can be done in real-time via the portable container, an associated device, or via e-mail or other messaging means, for example. By further means of example, information on many users and user histories can be compiled. For example, if user histories associated with male users between the ages of 25 and 32 show that most users first approach the sale display in sandals, and never approach a display on sandals of model C, information about the optimal layout for merchandise can be gathered. It can be understood by this example data that sandals of model C are not located in a location conducive to attracting the attention of male users between the ages of 25 and 32. In addition to using user history and user profile information to tailor and optimize store layout and provide targeted marketing, the information can be used to determine popular items, the appropriateness of fit of clothing items, the number of items that are replaced after being added to a user's portable container, the location of items within a store, the types of shoppers that shop at certain times of day, the effectiveness of a display, and many other imaginable uses.

Figure 8:
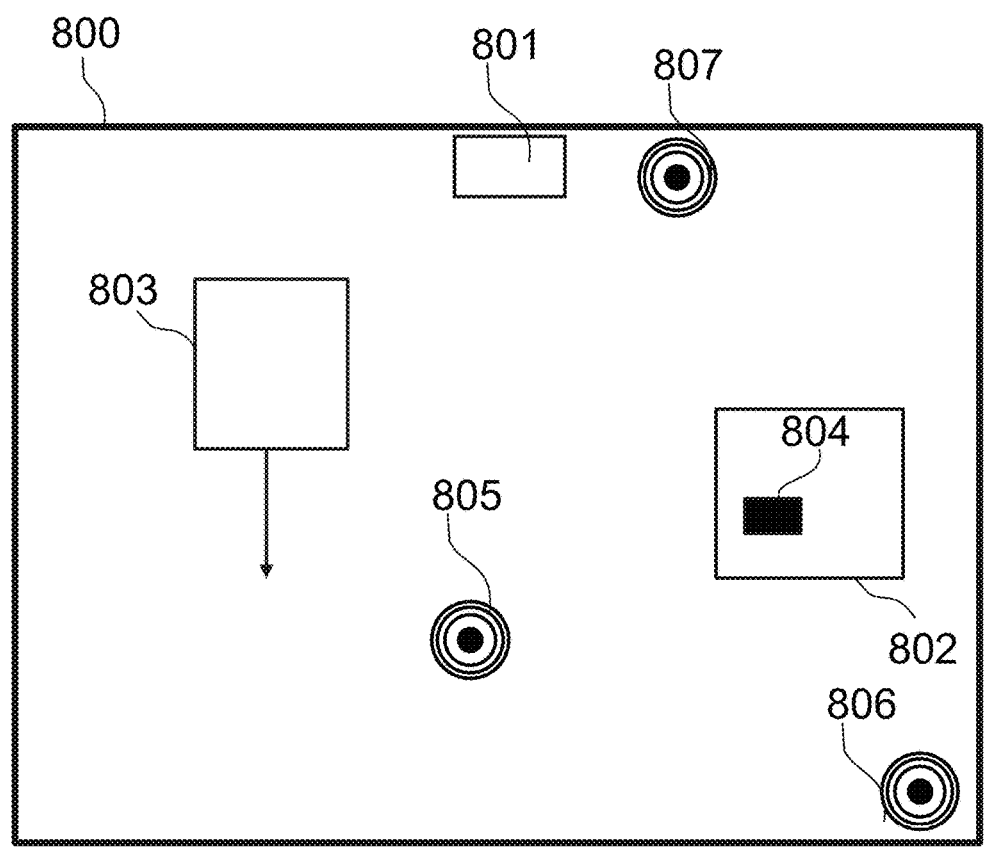
FIG. 8 depicts an exemplary space having a plurality of portals and transponders located throughout for interacting with portable containers, according to some embodiments.

In some embodiments, portable electronic devices and/or portable containers may be operated within a pre-determined location, wherein the pre-determined location has one or more portals located at multiple positions. As illustrated by way of example in FIG. 8, a predetermined location 800 (e.g., a retail store) can comprise three separate portals: (i) a portal substantially defined by or associated with an entrance or exit 801, (ii) a portal that is a mobile portal 803, or (iii) a stationary portal 802. When a portable container 804 is placed within a 3 dimensional volume defined by a portal, or on a 2 dimensional surface defined by a portal, the portable container 804 and the portal may exchange information. This information may include, but is not limited to, the presence of the portable container, information identifying the portable container and/or one or more users currently associated with the portable container (e.g., a user that is currently using the portable container), inventory information regarding items placed within the container, inventory information regarding items within or on the portal but not placed within the container, user information such as user identity or characteristics, advertisements, a status of the portable container (e.g., battery charge, version of software and/or hardware, time since last service, model number, etc.), and more. The presence of a portable container in a predetermined portal may initiate or complete an action, such as payment or an inventorying event.

By means of example, upon portable container 804 entering the portal 801 associated with the exit of a store, the portal 801 may detect the portable container 804 and cause a checkout event to be initiated. By additional means of example, upon portable container 804 entering the portal 801 associated with the exit of a store, an inventorying event may be triggered. By still further means of example, upon portable container 804 entering the portal 802 associated with a changing room, information may be transferred between the portable container and an external wireless device. Portals may be present within or be associated with conveyor belts, on walls, in closets, as part of a computer system, and/or as part of mobile objects. Portals may be defined by, or associated with, interrogators, readers, transponders, and other components herein described.

Portals define 3 dimensional volumes and/or 2 dimensional areas within or on which tags and/or portable containers may be identified, modified, or accounted for. It may be additionally, or separately, desirable to identify the location of a portable container and/or an associated user or item within a predetermined location that is not limited to a 3 dimensional volume that is a subset of the location. By means of example, a predetermined location may have associated with it transponders 805, 806, and 807. These transponders may communicate with electronic objects, tags, portable containers, mobile devices, and other devices. Together or separately, the transponders may comprise part of a positioning system (although other types of positioning systems are also possible, as described above). Transponders are not required to have a predetermined 3 dimensional volume of interaction.

Examples of transponders include: acoustic, Bluetooth, WiFi, electromagnetic, optical, visible, infrared, magnetic, Radio Frequency, and more. In one example of transponder functionality, at least 3 transponders are required. By means of further example, a mobile device, such as a mobile phone, may have a navigation component installed, and information about location may be communicated to one or more transponders from the navigation component. By still further means of example, the timing of signals received from a portable container and 1 or more transponders, and more preferably 3 or more transponders, may be used to define a position within a space. The space may be a retail store, a shopping mall, an airport terminal, or any indoor or outdoor space. As an additional means of example, the strength of a signal from a portable container, a tag associated with a portable container, or an external device associated with a portable container, as received by one or more transponders may be used to identify the location of the portable container, and the user thereof.

By these methods and extensions therein, data can be gathered on the location and behavior of users, items, and portable containers within a predetermined location (e.g., a retail store). This information can be valuable in defining the optimal location or organization of goods within a retail store environment, in communicating information to staff about users and user shopping experiences, and optimizing store layout, in addition to many additional uses that one skilled in the art will recognize as direct extensions of the current invention.

As discussed previously, a portable container may define a 3 dimensional volume within which tagged items may be inventoried. The 3 dimensional volume may be defined by a portable container containing one or more readers. The portable container object may have an associated zone or subzone which is the intended 3-dimensional space within which tags and items will be placed. This zone is accessed by electromagnetic signals initiated by an interrogator disposed within the 3 dimensional volume, or external to the 3 dimensional volume. The zone may be defined by shielding material that substantially attenuates, modifies, or interacts with predetermined wireless signals including, but not limited to, signals initiated by the interrogator, or signals detected by the reader. The zone may additionally be defined by controlling the wireless signals initiated by interrogator. By means of example, the interrogator may emit a signal of a defined power and with defined direction. The signal may diminish in intensity as a predetermined function of distance from the interrogator. The zone may then be defined as the region in the vicinity of the interrogator wherein the signal is sufficient to read a tag.

Still further, the zone may be defined by software. By means of example, one or more readers may be configured to apply a software filter to reader signals received from tags to determine whether the tags are within the three dimensional volume and/or two dimensional area of a portal or not. For example, the one or more readers may determine that a tag is within the three dimensional volume and/or two dimensional area if a certain minimum number of readers associated with the portal receive a reader signal associated with a tag, but not if less than the minimum number of readers receive the reader signal. The one or more readers may also determine that a tag is within the three dimensional volume if a signal strength of a reader signal associated with a tag is above a certain threshold, but not if it is below a certain threshold.

Interrogators, readers, transponders (electronic devices) or combinations therein may create a portal. The electronic devices may be stationary or mobile within a defined absolute vicinity, or a defined vicinity relative to another electronic device or defined zone. The electronic device may communicate with another electronic device via a wired or wireless connection.

The electronic devices that define a portal may be used to define a 3 dimensional volume. There may be many electronic devices (e.g., portals) placed over an area. These electronic devices may communicate with a reader and systems connected to the reader. The electronic devices of the portal may determine the direction from which a reader signal from a tag is received, signal strength of the reader signal, spectral and electronic information of the reader signal, and can read tag information sent. The electronic devices associated with a portal may additionally determine the same characteristics regarding other types of signals (e.g., signals other than reader signals from a tag). The electronic device may communicate with other readers or interrogators via a wired or wireless communication interface. The electronic devices may define a zone, wherein the devices can detect when a portable electronic device or container is in the zone. This can be achieved by, for instance, providing a portable container with a permanent or detachable tag that identifies the portable container, and having the portal detect the tag using the same methods described above. The zone defined by a portal may be a charging station. The electronic devices that define a portal may be turned on and off. The electronic devices may be active or passive.

The electronic devices that define a portal may be configured to emit sounds that indicate readability of tags. This sound may be transferred to headphones, ear-buds, and other electronic devices. The portal may also have, or be communicably coupled with a device having, a display. The display may be configured to convey information on point of sales, target analytics, target advertising, inventory, item information, consumer behavior, or relay related information. The electronic devices of a portal may be part of or facilitate the functioning of a positioning system, as described above. The electronic devices at a portal may additionally query and/or receive a user identity. The portal may receive this user identity by querying and/or receiving such an identity from a paired portable container, or directly from a user by, for instance, establishing a wireless or wired communication session with the user's mobile device, reading a piece of media associated with the user, or receiving user login information via a user interface (as described in detail herein). The portal may also access and/or edit an on-line profile of the customer being hosted at a server based on the inventory data collected by the portal. The communications between the portal and the server hosting the on-line profile may be encrypted and/or authenticated.

The electronic devices may triangulate to determine the exact position of the tag and that it is within the field of view. An external electronic device may communicate with the reader to process this information and send to the reader. The sensor and/or reader may authenticate a portable container in a reading zone of the tags. The electronic devices may be shielded from particular electromagnetic signal. The electronic devices may relay information about this shielding and/or area of shielding to a particular volume.

The "zone" or 3 dimensional volume as mentioned in the above discussion may be used for payment purposes of the portable container. The "zone" as mentioned may be defined by software. This may be defined as a navigation position of the portable container to represent a zone. The zone may further be activated by a sensor measuring weight of the portable electronic device or container from an external sensor, motion of the portable container by an external or internal sensor, and image of the portable electronic device or container if placed in defined location. The portable container may be identified by at least one tag, a reader, a symbol or recognition based on packaging by means of coloring, insignia, signature, symbol, bar-code, or related method. The said tag determining the portable container may have security encryption such as a key for an interrogator and/or reader as part of and/or external to the portable electronic device or container. The tag may be an RFID, WiFi, broadband, or another signal.

Figure 9:
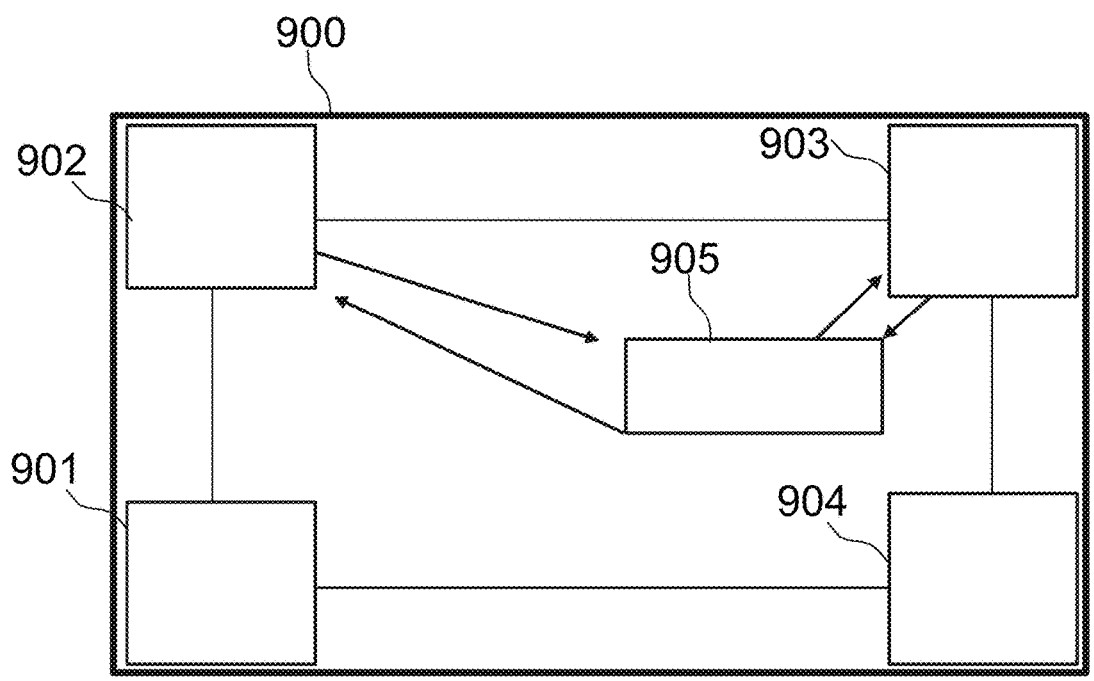
FIG. 9 depicts an exemplary portable container having multiple readers configured to detect tags placed within the portable container, according to some embodiments.

As illustrated by way of example in FIG. 9, a portable container 900 may comprise a first reader 901, a second reader 902, a third reader 903, and a fourth reader 904. The readers may be located at multiple positions within the portable container 900, such as at the corners of a rectangular space (as depicted). In some embodiments, the readers may also comprise one or more directional antennas that are configured to be sensitive to signals received from a certain direction, but to be less sensitive to signals received from another direction. Readers with one or more directional antennas may be oriented in a certain way so as to define the three dimensional volume—for instance, readers 901, 902, 903, and 904 may be oriented so that their antenna are pointed toward the interior of the three dimensional volume, which cause the readers 901, 902, 903, and 904 to be more sensitive to signals originating from inside the three dimensional volume than to signals from outside the three dimensional volume. The readers may receive reader signals from one or more tags 905. In one embodiment, the 3 dimensional volume may be defined by the power density of electromagnetic radiation received by the one or more readers, as well as by software. By means of example, if the power of a reader signal sent from a tag is above a predetermined threshold value, the tag may be classified as read by a reader. If the tag is read by 2 or more readers, then the tag may be determined to be present in the 3 dimensional volume. In some embodiments, a tag that is read by only one or two readers may be determined by software to not be present within the 3 dimensional volume, but a tag that is read by 3 or more readers may be determined by software to be present. By these means, a 3 dimensional volume may be defined in conjunction with, or in the absence of, shielding.

Still further, information about the signal strength may be used to determine relative location of a tag to a reader within a predetermined 3 dimensional volume. By these means, and by way of example, subzones can be conceived within a predetermined 3 dimensional volume. By means of example, if a first and second reader read a tag, but a third and fourth reader do not read a tag, then the tag will be considered to be in a first zone. If a third and fourth reader read a tag, but a first and second reader do not read a tag, then the tag will be considered to be in a second zone.

The portable container may contain one or more readers. Specifically, a portable container may comprise or be associated with 1 reader, 2 reader, between 3 and 5 readers, between 5 and 10 readers, and more than 10 readers.

The portable container may be in communication with a computer system that stores and uses inventory and customer information. By means of example, a portable container with reader in communication with one or more tags may communicate information about tags to said computer system. This information may be processed or used by the computer system to determine if the information transferred is consistent with a predetermined expectation. By such means error checking may be performed and double-counting may be avoided. The portable container may comprise a display, a sensor, or a plurality of sensors and displays that interface with a user. This interface may be biometric, tactile, visual, auditory, or vocal. The purpose of this interface may be in part for user identification and authentication. The sensors may include, but are not limited to, an accelerometer or weight sensor. Extensions of these concepts will apply to additional uses and systems as can be recognized by one skilled in the art.

The portable container may communicate information wirelessly to an external electronic device based on location, proximity to sensors, item content, actuation of a button, interaction with a display, or others. This information may include, but is not limited to, customer information, desire to check out, payment information, item information, and more. This information may be used by a software program to modify a database. This modification may include, but is not limited to, updating inventory.

By identifying a user associated with a portable container using the methods described above, external databases may be referenced by software to identify additional customer information including, but not limited to, customer order history, customer attributes, and customer preferences. This information may be used by software to produce a signal that is communicated to the portable container and/or associated electronic wireless devices wirelessly whereby said communication results in an indication including a display of text, display of color or light, sound, vibration, and more.

Figure 10:
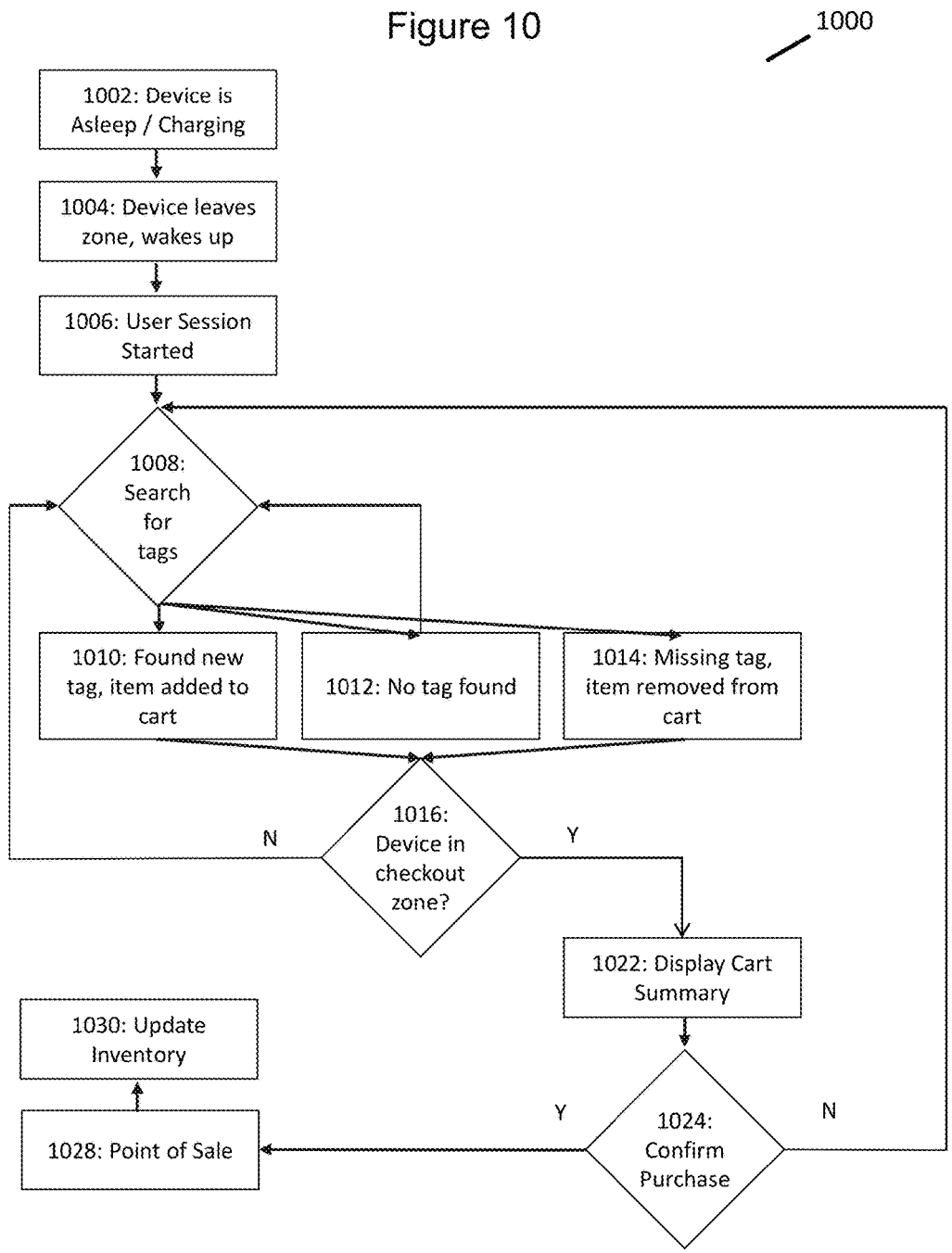
FIG. 10 depicts an exemplary process for updating an inventory of tags, and performing an automatic checkout operation, according to some embodiments.

FIG. 10 provides an example process flow diagram 1000 for a point-of-sale system comprising a portable container. At step 1002, the container is present at a charging station, and is not active. At step 1004, upon a user or employee removing the container from the predefined charging zone, defined by a portal, the container is powered on. At step 1006, the user or employee establishes an association between the portable container and a user identity. As described above, this association may be established by providing the portable container with the user identity, such as by pairing the portable container with a mobile electronic device associated with the user (e.g., with the user's phone), by reading or scanning media containing user identifying information, by taking a biometric signature associated with the user, and/or by accepting user input containing a user's login credentials. The association may also be established by providing both the user identity (e.g., a username or serial number associated with a user) as well as a portable container identity (e.g., a serial number or code that uniquely identifies a particular portable container) to a remote server, when then associates the user identity with the portable container identity.

At step 1008, the portable container begins searching for tags within its three dimensional volume. Upon reading of a new tag, the portable container branches to step 1010, where the item associated with the tag is added to a virtual shopping cart. The portable container then branches to step 1016. Upon no longer reading a tag that was previously present in the portable container, the container branches to step 1014, where the item associated with the tag is removed from the virtual shopping cart. The portable container then branches to step 1016. If no tags are found and there are currently no tags within the virtual shopping cart, the container branches to step 1012, which causes the container to branch back to step 1008. The reading of tags and determination of whether a tag is present within a predefined zone of the portable container may involve software, algorithms, and timing schemes.

At step 1016, the portable container determines whether the portable container is located within or on a portal that defines a checkout zone. If not, the portable container branches back to step 1008. If yes, the portable container branches to step 1022, where the option to checkout is provided and a virtual shopping cart inventory may be displayed. The portable container may also display a prompt asking the user and/or an employee to confirm the purchase (step 1024).

If the user or employee confirms the purchase, the process branches to step 1028. There, the portable container can communicate with a wireless mobile device and/or a server. The mobile device and/or server can process payment for the user by deducting an online bank account or credit card account associated with the user. In some embodiments, this checkout process can also comprise a reprogramming of tags attached to items within the portable container. This reprogramming can cause the tags to reflect the changed status of the items as being purchased items. This reprogramming can cause the tags to no longer react, or to react differently, when scanned by wireless security devices positioned at the exit of a store. In this way, items that have been paid for would not trip any security measures intended to catch shoplifters, but items that have not been paid for can still be detected by security devices (e.g., RFID readers) positioned at shop exits. The process then branches to step 1030, at which the mobile device and/or server can either update the store's inventory, or communicate with another server that updates the store's inventory.

If the user or employee does not confirm the purchase, the process branches back to step 1008, where searching for tags is reinitiated. The described process flow diagram is a subset of possible process flow diagrams described by the inventions herein.

Figure 11:
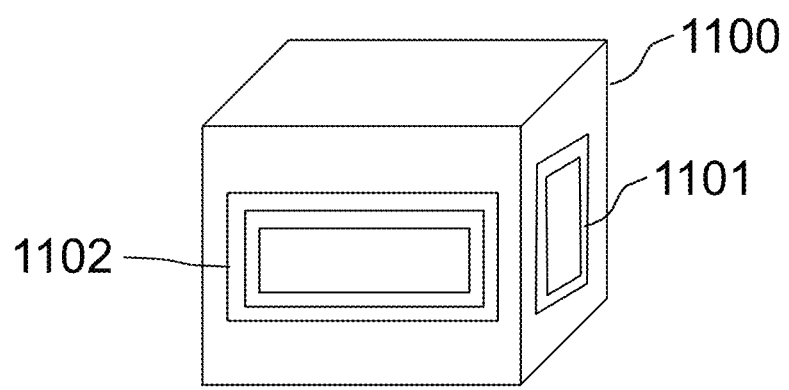
FIG. 11 depicts an exemplary configuration of antennas on a portable container, according to some embodiments.

As illustrated by way of example in FIG. 11, a portable container 1100 may comprises a first antenna 1101 and a second antenna 1102. Although not shown, additional antennas may also be disposed within or on the sides or surfaces of the portable container 1100. For example, for containers comprising a rectangular box with six sides, antennas may be disposed on all six sides, or on five sides (leaving a top side open) so as to define a three dimensional, rectangular interior volume. Antennas may extend to multiple sides and be geometries other than substantially planar. The antennas may be coupled with a reader and/or an interrogator, and may be located such that a predetermined 3 dimensional volume is defined. The orientation, geometry, and design of the antenna and container can be such that electromagnetic energy radiated from the antennas are substantially located within the boundaries of the container. Alternatively, or in addition, the orientation, geometry, and design of the antennas can be such that the antennas are more sensitive to electromagnetic energy radiated from within the three dimensional volume than to electromagnetic energy originating from sources outside the three dimensional volume. The orientation of one or more of the antennas, independently of or in conjunction with shielding, may improve the read accuracy and/or reliability of a portable container. In some embodiments, the one or more antennas may be attached to the housing of the portable container that defines a three dimensional interior volume. Together, the one or more antennas may cover at least 25%, at least 50%, or at least 75% of the housing. As used herein, an antenna is understood to "cover" part of a housing if the antenna extends substantially throughout, outlines, and/or otherwise defines a two dimensional area that covers part of the housing. By means of example, antenna 1102 can be considered to "cover" at least 50% of one surface of the housing, even though there are gaps between the wires of antenna 1102. This is because the wires of antenna 1102 extend throughout and defines a two dimensional area that covers at least 50% of the surface. By means of example, the orientation of one or a plurality of antennas may create electromagnetic energy that is directed in one or a plurality of directions. Tags that may be associated with metallic objects, or other objects that may interfere with reader or interrogator signals, may be read more accurately when antennas are provided with predefined orientations, or when antennas are provided that effectively surround some or all of the three dimensional volume.

Figure 12:
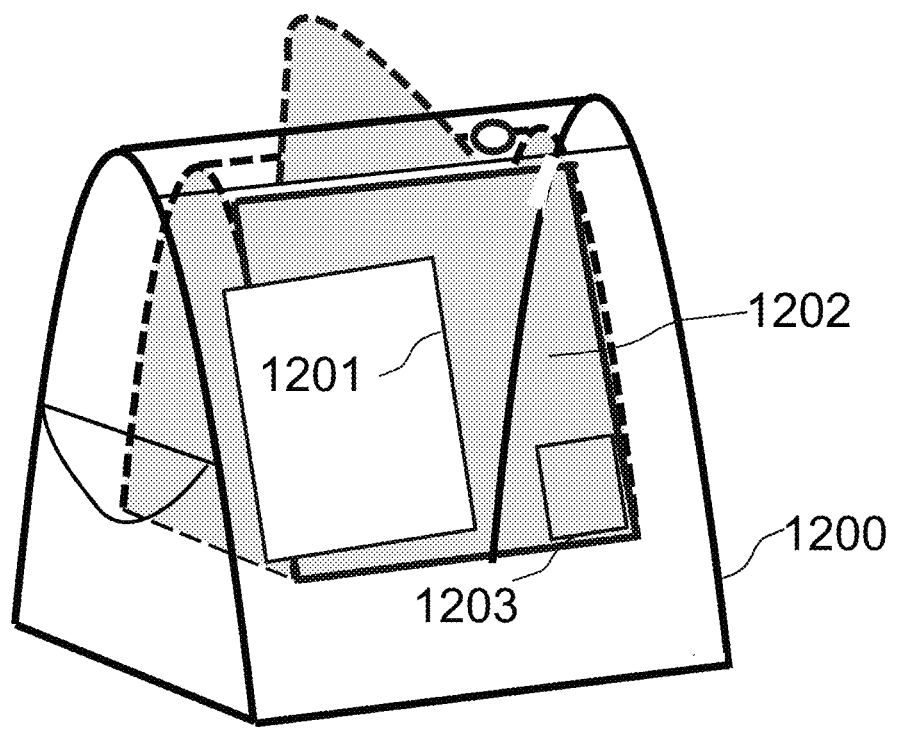
FIG. 12 depicts an exemplary portable container having an additional mobile object disposed therein, according to some embodiments.

As illustrated in FIG. 12, the portable container 1200 comprises a reader 1201 and an additional mobile object 1202. The additional mobile object 1202 may or may not be electronic in nature. By means of example, the portable container 1200 is a bag and the additional mobile object 1202 is a detachable liner bag that is substantially inside of the three dimensional volume of the portable container 1200. Any items placed within the mobile object 1202 (detachable liner bag) may be interrogated by an interrogator and read by a reader configured to inventory items placed within the portable container 1200. By further means of example the additional mobile object may be affixed to or associated with the portable container by means of mechanical attachment, magnets, fasteners, and more. The additional mobile object 1202 may be separated from the portable container 1400, for example, by pulling it out of the portable container 1200. By means of further example, the separation of the additional mobile object 1202 may be prevented until a predetermined event or set of events including, but not limited to, payment confirmation or store employee authentication. The additional mobile object 1202 (e.g., detachable liner bag) may comprise a tag 1203. When a reader and/or interrogator determines that tag 1203 is no longer within portable container 1200, the reader and/or interrogator can determine that mobile object 1202 (e.g., detachable liner bag) has been removed from container 1200. This determination can signal an event, including but not limited to, a checkout process, payment, removal of user data, and more. Alternatively, the tag 1203 may be added to the additional mobile object 1202. When the reader and/or interrogator determines that tag 1203 has been added to the three dimensional volume defined by container 1200, this determination can also signal an event, including but not limited to, a checkout process, payment, removal of user data, and more.

Figure 13:
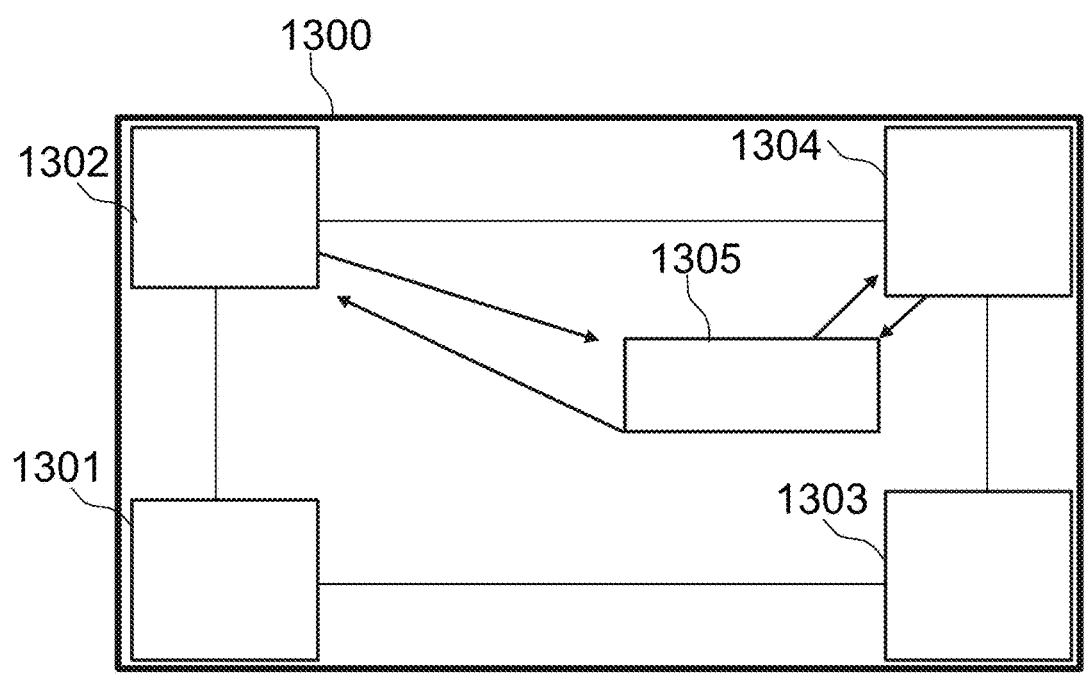
FIG. 13 depicts an exemplary portal having multiple readers, according to some embodiments.

A portal may be established by one or more readers associated with a predefined volume. Portals may have zones and subzones, which may be a two dimensional surface and/or a three dimensional volume having a certain location and certain dimensions. Defining a portal, a zone, or a subzone may be desirable for the purposes of locating an object, such as a portable container, within a given environment, such as a store. As illustrated by way of example in FIG. 13, a zone of a portal 1300 comprises a first reader 1301, a second reader 1302, a third reader 1303, and a fourth reader 1304. The readers communicate with one or a plurality of portable containers 1305, and/or tags placed within the portable containers 1305 (not shown). In one embodiment, the 3 dimensional volume is defined by the power density of electromagnetic radiation received by one or more readers. By means of example, if the power of a signal received from a tag is above a predetermined threshold value, the tag is read or classified as read by a reader. If the tag is read by 2 or more readers, then the tag is determined to be present in the 3 dimensional volume. Software can be used to determine whether an item is within the predetermined 3 dimensional volume. By means of example, an application may define a tag that is read by one reader to not be present in the 3 dimensional volume, but a tag that is read by 3 or more readers to be present. By these means, a 3 dimensional volume may be constructed in conjunction with, or in absence of, shielding. Still further, information about the signal strength can be used to determine relative location of a tag to a reader within a predetermined 3 dimensional volume. By these means, and by way of example, subzones can be conceived within a predetermined 3 dimensional volume. Portals and zones of portals may be additionally be defined by interrogators, transponders, positioning systems, and other electronic devices.

Although some of the actions and/or functionalities described herein are described as being performed by a portable container, these actions and/or functionalities can also be performed by a portable electronic device. A portable electronic device can be a device that includes at least one of a reader, interrogator, and/or transponder. This device can be part of a portable container, or can be a separate device that is placed within the portable container, according to some embodiments. For example, a portable container as used and described above may be created by placing a portable electronic device having at least one of a reader, an interrogator, and/or a transponder within the container. Conversely, although some of the actions and/or functionalities described herein are described as being performed by a portable electronic device, these actions and/or functionalities can also be performed by a portable container.

Any of the embodiments and/or features described above in relation to any figure may be combined with embodiments and/or features described in relation to other figures. For example, the multiple readers of FIG. 9 may be combined with the interrogators, transponders, and external wireless devices of FIGS. 1, and 3-7. The charging devices described in FIG. 7 may be combined with features described in any of the other figures. Similarly, the antennas described above in relation to FIG. 11 may be combined with features described in any of the other figures. In general, the embodiments described above in relation to each of the figures are meant to be exemplary only, and may be combined with features described in any other figure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A user-portable container that precisely inventories items within it, the container comprising:
   a housing comprising electromagnetic shielding material that defines at least part of a three-dimensional interior volume for holding items placed into the container by a user, wherein at least one side of the housing is configured to remain uncovered at all times;
   an interrogator positioned in the interior volume and configured to repeatedly send interrogation signals to detect identifying tags attached to one or more items within the interior volume, wherein the shielding material is configured to at least partially inhibit the interrogation signals from propagating outside the interior volume and thereby inhibit the detection of tags outside of the container;
   a reader positioned in the interior volume and configured to detect identifying response signals produced by one or more identifying tags; and
   a communication interface configured to send information using a plurality of communication protocols regarding the detected response signals so that the response signals may be analyzed to determine whether the one or more identifying tags are within the interior volume or outside the interior volume.

2. The user-portable container of claim 1, wherein the interrogator and the reader are part of a single device.

3. The user-portable container of claim 1, wherein the communication interface is configured to provide the information regarding the response signals to an adjunct processor configured to maintain an inventory of items disposed within the interior volume based on the response signals.

4. The user-portable container of claim 3, wherein the processor is configured to add an item to the inventory of items only when an identifying response signal associated with the added item is received at least a plurality of times in response to a pre-determined number of interrogation signals.

5. The user-portable container of claim 3, wherein the processor is configured to remove an item from the inventory of items when the reader does not detect a response signal from a tag associated with the removed item for a pre-determined number of consecutive interrogation signals.

6. The user-portable container of claim 3, wherein the processor is located outside of the user-portable container.

7. The user-portable container of claim 3, wherein the processor is part of the user-portable container.

8. The user-portable container of claim 3, wherein
   the user-portable container comprises a liner bag disposed within the interior volume, the liner bag comprising a liner tag that produces liner tag response signals;
   the reader is configured to detect the liner tag response signals; and
   the adjunct processor is configured to:
      determine, via the reader, a presence or absence of the liner tag response signals, and
      based on the presence or absence of the liner tag response signals, initiate an automatic checkout event.

9. The user-portable container of claim 1, wherein a signal strength of the interrogation signals is selected so as to be sufficient to reach substantially all of the interior volume, but not substantially stronger.

10. The user-portable container of claim 1, wherein the user-portable container is configured to be associated with a user for a temporary period of time.

11. The user-portable container of claim 1, wherein the interrogator is configured to send the interrogation signals at a rate of at least five times per second.

12. A system that precisely inventories items within a user-portable container, the system comprising:

an interrogator positioned outside the user-portable container and configured to repeatedly send interrogation signals to detect identifying tags attached to one or more items; and the user-portable container comprising:
- a housing comprising electromagnetic shielding material that defines at least part of a three-dimensional interior volume for holding items placed into the container by a user, wherein at least one side of the housing is configured to remain uncovered at all times,
- a reader positioned in the interior volume and configured to detect identifying response signals produced by one or more identifying tags in response to the repeated interrogation signals, wherein the electromagnetic shielding material is configured to at least partially inhibit the response signals from propagating outside the interior volume, and
- a communication interface configured to send information using a plurality of communication protocols regarding the detected response signals so that the response signals may be analyzed to determine whether the one or more identifying tags are within the interior volume or outside the interior volume.

13. The system of claim 12, wherein the communication interface is configured to provide the information regarding the response signals to an adjunct processor configured to maintain an inventory of items disposed within the interior volume based on the response signals.

14. The system of claim 13, wherein the processor is configured to add an item to the inventory of items only when an identifying response signal associated with the item is received at least a plurality times in response to a pre-determined number of interrogation signals.

15. The system of claim 13, wherein the processor is configured to remove an item from the inventory of items when the reader does not detect a response signal from a tag associated with the removed item for a pre-determined number of consecutive interrogation signals.

16. The system of claim 13, wherein the processor is located outside of the user-portable container.

17. The system of claim 13, wherein the processor is part of the user-portable container.

18. The system of claim 12, wherein the interrogator is part of a portal device installed at a fixed location.

19. The system of claim 12, wherein the interrogator is part of a mobile device.

20. The system of claim 12, wherein the user-portable container is configured to be associated with a user for a temporary period of time.

21. The system of claim 12, wherein the shielding material of the user-portable container defines an opening into the interior volume, and wherein the interrogator is configured to send the repeated interrogation signals through the opening.

22. A system that precisely inventories items within a user-portable container, the system comprising:
the user-portable container comprising:
- a housing comprising electromagnetic shielding material that defines at least part of a three-dimensional interior volume for holding items placed into the container by a user, wherein at least one side of the housing is configured to remain uncovered at all times, and
- an interrogator positioned in the interior volume and configured to repeatedly send interrogation signals to detect identifying tags attached to one or more items, wherein the shielding material is configured to at least partially inhibit the interrogation signals from propagating outside the interior volume and thereby inhibit the detection of tags outside of the container;
- a reader positioned outside the interior volume and configured to detect identifying response signals produced by one or more identifying tags in response to the repeated interrogation signals; and
- a communication interface configured to send information using a plurality of communication protocols regarding the detected response signals so that the response signals may be analyzed to determine whether the one or more identifying tags are within the interior volume or outside the interior volume.

23. The system of claim 22, wherein the communication interface is configured to send the information regarding the detected response signals to an adjunct processor configured to maintain an inventory of items disposed within the interior volume based on the response signals.

24. The system of claim 23, wherein the processor is configured to add an item to the inventory of items only when an identifying response signal associated with the item is received at least a plurality of times in response to a pre-determined number of interrogation signals.

25. The system of claim 23, wherein the processor is configured to remove an item from the inventory of items when the reader does not detect a response signal from a tag associated with the removed item for a pre-determined number of consecutive interrogation signals.

26. The system of claim 22, wherein the user-portable container is configured to be associated with a user for a temporary period of time.

27. The system of claim 22, wherein the shielding material of the user-portable container defines an opening into the interior volume, and wherein the reader is configured to detect response signals that exit the interior volume through the opening.

* * * * *